(12) United States Patent
Banerjee et al.

(10) Patent No.: US 9,461,983 B2
(45) Date of Patent: Oct. 4, 2016

(54) MULTI-DIMENSIONAL FRAMEWORK FOR DEFINING CRITERIA THAT INDICATE WHEN AUTHENTICATION SHOULD BE REVOKED

(71) Applicant: Danal Inc., San Jose, CA (US)

(72) Inventors: Atreedev Banerjee, San Jose, CA (US); Jillian Cocklin, San Jose, CA (US)

(73) Assignee: Danal Inc., San Jose, CA (US)

( * ) Notice: Subject to any disclaimer, the term of this patent is extended or adjusted under 35 U.S.C. 154(b) by 28 days.

(21) Appl. No.: 14/458,058

(22) Filed: Aug. 12, 2014

(65) Prior Publication Data
US 2016/0050192 A1    Feb. 18, 2016

(51) Int. Cl.
| | |
|---|---|
| *H04L 9/32* | (2006.01) |
| *G06F 21/45* | (2013.01) |
| *H04L 29/06* | (2006.01) |
| *G06F 21/41* | (2013.01) |
| *G06F 21/33* | (2013.01) |
| *G06F 17/30* | (2006.01) |

(52) U.S. Cl.
CPC .............. *H04L 63/08* (2013.01); *G06F 21/335* (2013.01); *G06F 21/41* (2013.01); *H04L 9/3268* (2013.01); *H04L 63/0807* (2013.01); *H04L 63/0815* (2013.01); *H04L 63/0823* (2013.01); *H04L 63/0884* (2013.01); *H04L 63/20* (2013.01)

(58) Field of Classification Search
CPC .......... H04L 63/0815; H04L 63/0807; H04L 63/0823; H04L 63/083; H04L 63/20; H04L 63/08; H04L 63/0884; H04L 67/14; H04L 9/3268; H04L 2209/76; G06F 21/41; G06F 21/335; G06F 17/30592; H04W 12/06
See application file for complete search history.

(56) References Cited

U.S. PATENT DOCUMENTS 5,586,260 A * 12/1996 Hu .................. G06F 21/33
                                                    704/272
5,684,950 A * 11/1997 Dare ................ G06F 21/41
                                                    726/10

(Continued)

FOREIGN PATENT DOCUMENTS

| CA | 2723173 C | 10/2013 |
| CN | 102184204 B | 3/2013 |

(Continued)

OTHER PUBLICATIONS

Aubry, Pascal, Vincent Mathieu, and Julien Marchal. "ESUP-Portail: open source single sign-on with CAS (central authentication service)." Proc. of EUNIS04—IT Innovation in a Changing World (2004): 172-178.*

(Continued)

*Primary Examiner* — Michael Simitoski
(74) *Attorney, Agent, or Firm* — Shvarts & Leiz LLP

(57) ABSTRACT

Methods and systems are presented for defining criteria that indicate when authentication for an identified client device should be revoked based on rules associated with interested parties. Authentication information is stored that indicates that an identified client device is authenticated. Rules that are associated with a plurality of interested parties and include rules of different rule types may also be stored. Criteria may be defined based on the rules and the authentication information, the criteria indicating when authentication of the identified client device should be revoked. Authentication of the identified client device may be revoked based on the criteria.

22 Claims, 11 Drawing Sheets

(56) References Cited

U.S. PATENT DOCUMENTS

| | | | | |
|---|---|---|---|---|
| 5,875,296 | A * | 2/1999 | Shi | G06F 21/41 726/5 |
| 5,918,232 | A * | 6/1999 | Pouschine | G06F 17/30592 |
| 6,606,663 | B1 * | 8/2003 | Liao | G06Q 20/20 705/25 |
| 6,678,731 | B1 * | 1/2004 | Howard | G06F 21/31 709/225 |
| 6,934,706 | B1 * | 8/2005 | Mancuso | G06F 17/30893 |
| 7,039,714 | B1 * | 5/2006 | Blakley, III | H04L 63/0815 709/229 |
| 7,243,369 | B2 * | 7/2007 | Bhat | H04L 67/02 713/182 |
| 7,356,559 | B1 | 4/2008 | Jacobs et al. | |
| 7,373,659 | B1 * | 5/2008 | Vignoles | H04L 63/1416 714/E11.207 |
| 7,735,122 | B1 * | 6/2010 | Johnson | G06Q 20/383 705/74 |
| 7,970,743 | B1 * | 6/2011 | Kilday | G06Q 30/0603 707/689 |
| 8,407,465 | B2 | 3/2013 | Naaman et al. | |
| 8,645,282 | B2 | 2/2014 | Vakil et al. | |
| 8,655,782 | B2 | 2/2014 | Poon et al. | |
| 2001/0037469 | A1 * | 11/2001 | Gupta | G06F 21/33 726/2 |
| 2001/0045451 | A1 * | 11/2001 | Tan | G06F 21/33 235/375 |
| 2002/0156905 | A1 * | 10/2002 | Weissman | H04L 29/06 709/229 |
| 2002/0184217 | A1 * | 12/2002 | Bisbee | G06F 21/33 |
| 2003/0028451 | A1 | 2/2003 | Ananian | |
| 2003/0074580 | A1 * | 4/2003 | Knouse | H04L 63/0815 726/4 |
| 2003/0115142 | A1 | 6/2003 | Brickell | |
| 2004/0128542 | A1 * | 7/2004 | Blakley, III | H04L 63/0281 726/12 |
| 2004/0148410 | A1 * | 7/2004 | Howard | G06F 21/31 709/229 |
| 2005/0005094 | A1 * | 1/2005 | Jamieson | H04L 63/0807 713/155 |
| 2005/0015490 | A1 * | 1/2005 | Saare | H04L 63/0815 709/225 |
| 2005/0055578 | A1 * | 3/2005 | Wright | G06F 21/32 726/4 |
| 2005/0257072 | A1 * | 11/2005 | Cross | H04L 63/06 713/193 |
| 2006/0156391 | A1 * | 7/2006 | Salowey | H04L 63/0823 726/5 |
| 2007/0094503 | A1 * | 4/2007 | Ramakrishna | H04L 9/0822 713/172 |
| 2007/0143829 | A1 * | 6/2007 | Hinton | H04L 63/0815 726/5 |
| 2008/0184351 | A1 | 7/2008 | Gephart et al. | |
| 2008/0256593 | A1 * | 10/2008 | Vinberg | G06Q 10/06 726/1 |
| 2009/0006646 | A1 | 1/2009 | Duarte | |
| 2009/0132405 | A1 | 5/2009 | Scipioni et al. | |
| 2009/0132813 | A1 | 5/2009 | Schibuk | |
| 2009/0144540 | A1 * | 6/2009 | Davis | H04L 9/3271 713/156 |
| 2009/0210293 | A1 | 8/2009 | Steele et al. | |
| 2010/0010932 | A1 | 1/2010 | Law et al. | |
| 2010/0017596 | A1 | 1/2010 | Schertzinger | |
| 2010/0077208 | A1 | 3/2010 | Appiah | |
| 2010/0154025 | A1 * | 6/2010 | Esteve Balducci | H04L 63/20 726/1 |
| 2010/0199334 | A1 * | 8/2010 | Ehrensvard | G06F 21/34 726/5 |
| 2011/0047132 | A1 * | 2/2011 | Kilday | G06Q 10/10 707/694 |
| 2011/0065418 | A1 | 3/2011 | Ryu et al. | |
| 2011/0082767 | A1 | 4/2011 | Ryu et al. | |
| 2011/0087880 | A1 * | 4/2011 | Sorniotti | H04L 9/321 713/155 |
| 2011/0125565 | A1 * | 5/2011 | MacIlwaine | G06Q 30/02 705/14.17 |
| 2011/0167470 | A1 | 7/2011 | Walker | |
| 2011/0231919 | A1 * | 9/2011 | Vangpat | H04L 63/0815 726/8 |
| 2012/0084199 | A1 | 4/2012 | Stone | |
| 2012/0124676 | A1 | 5/2012 | Griffin et al. | |
| 2012/0150748 | A1 | 6/2012 | Law et al. | |
| 2012/0150750 | A1 | 6/2012 | Law et al. | |
| 2012/0167162 | A1 | 6/2012 | Raleigh | |
| 2012/0227094 | A1 * | 9/2012 | Begen | H04L 63/0815 726/4 |
| 2012/0245985 | A1 | 9/2012 | Cho et al. | |
| 2012/0246004 | A1 | 9/2012 | Book et al. | |
| 2012/0275377 | A1 * | 11/2012 | Lehane | H04L 41/0816 370/328 |
| 2012/0289188 | A1 | 11/2012 | Marcus et al. | |
| 2013/0030934 | A1 | 1/2013 | Bakshi et al. | |
| 2013/0061333 | A1 | 3/2013 | Davis et al. | |
| 2013/0086656 | A1 * | 4/2013 | Paddon | G01S 19/246 726/6 |
| 2013/0198598 | A1 | 8/2013 | Kirsch | |
| 2013/0325611 | A1 | 12/2013 | Delug | |
| 2013/0346329 | A1 | 12/2013 | Alib-Bulatao et al. | |
| 2014/0047238 | A1 * | 2/2014 | Harty | H04L 9/3236 713/168 |
| 2014/0156531 | A1 | 6/2014 | Poon et al. | |
| 2014/0244348 | A1 | 8/2014 | Zamani et al. | |
| 2014/0249921 | A1 | 9/2014 | Nicklin et al. | |
| 2014/0278978 | A1 | 9/2014 | O'Conner et al. | |
| 2014/0282836 | A1 * | 9/2014 | Cai | H04L 63/105 726/1 |
| 2014/0344718 | A1 | 11/2014 | Rapaport et al. | |
| 2014/0373117 | A1 * | 12/2014 | Le Saint | G06F 21/33 726/6 |
| 2015/0019402 | A1 | 1/2015 | Berlin et al. | |
| 2015/0106893 | A1 * | 4/2015 | Hou | H04L 63/083 726/6 |
| 2015/0188777 | A1 * | 7/2015 | Frost | H04L 67/10 709/223 |

FOREIGN PATENT DOCUMENTS

| | | |
|---|---|---|
| EP | 1560394 A1 | 8/2005 |
| GB | 2507725 A | 5/2004 |
| KR | 1020030024127 A | 3/2003 |
| KR | 101107191 B1 | 1/2012 |
| WO | 2006016375 A1 | 2/2006 |
| WO | 2010008397 A1 | 1/2010 |
| WO | WO 2013/008056 A1 | 1/2013 |

OTHER PUBLICATIONS

Nobayashi, Daiki, et al. "Development of single sign-on system with hardware token and key management server." IEICE Transactions on Information and Systems 92.5 (2009): 826-835.*

Novotny, Jason, Steven Tuecke, and Von Welch. "An online credential repository for the grid: MyProxy." High Performance Distributed Computing, 2001. Proceedings. 10th IEEE International Symposium on. IEEE, 2001.*

Stubblebine, Stuart G. "Recent-secure authentication: Enforcing revocation in distributed systems." Security and Privacy, 1995. Proceedings., 1995 IEEE Symposium on. IEEE, 1995.*

EPO Form 1507N, Extended European Search Report and Search Opinion, from the European Patent Office in European Patent Application No. 15158564.3 dated Dec. 2, 2015.

EPO Form 1507N, Extended European Search Report and Search Opinion, from the European Patent Office in European Patent Application No. 15158569.2 mailed on Mar. 10, 2016.

International Search Report and Written Opinion of the International Searching Authority for application No. PCT/US2015/043493, mailed on Nov. 30, 2015.

(56) References Cited

OTHER PUBLICATIONS

International Search Report and Written Opinion of the International Searching Authority for application No. PCT/US2015/043492, mailed on Oct. 30, 2015.
EPO Form 1507N, Extended European Search Report and Search Opinion from the European Patent Office in European Patent Application No. 15158564.3, mailed on Dec. 11, 2015.
EPO Form 1507N, Extended European Search Report and Search Opinion from the European Patent Office in European Patent Application No. 15158567.6, mailed on Jan. 18, 2016.
International Search Report and Written Opinion of the International Searching Authority for application No. PCT/US2015/043494, mailed on Oct. 29, 2015.
U.S. Appl. No. 14/458,025, filed Aug. 12, 2014, Banerjee et al.
U.S. Appl. No. 14/458,071, filed Aug. 12, 2014, Leung et al.

* cited by examiner

MULTI-DIMENSIONAL FRAMEWORK FOR DEFINING CRITERIA THAT INDICATE WHEN AUTHENTICATION SHOULD BE REVOKED

The present disclosure relates to client device authentication management, and more particularly relates to defining criteria for revoking client device authentication based on rules associated with interested parties.

SUMMARY

Methods and systems are provided for defining criteria that indicate when authentication for an identified client device should be revoked based on rules associated with interested parties, and for revoking the authentication for the identified client device based on the criteria. Typically, different interested parties define different rules indicating when authentication for a client device should be revoked. It may be difficult to determine which rules should apply for managing client device authentication when multiple interested parties are involved. Accordingly, an aggregator system of the present disclosure may define criteria that indicate when authentication for an identified client device should be revoked based on rules associated with a plurality of interested parties. Interested parties may include a carrier system associated with the client device, a merchant system, a financial institution, a government organization, a school organization, a country, any other suitable interested party, or any combination thereof.

In some embodiments, an aggregator system stores authentication information associated with an identified client device, where the authentication information indicates that the client device has been authenticated. The aggregator system further stores rules information including rules of different rule types, where the rules are associated with a plurality of interested parties. The aggregator system further defines criteria that indicate when authentication of the identified client device should be revoked based on the authentication information and the rules information, where the aggregator system reconciles the rules associated with the plurality of interested parties when a conflict exists. The aggregator system further revokes authentication for the identified client device based on the criteria.

In some embodiments, an aggregator method includes storing authentication information associated with an identified client device, where the authentication information indicates that the client device has been authenticated. The aggregator method further includes storing rules information including rules of different rule types, where the rules are associated with a plurality of interested parties. The aggregator method further includes defining criteria that indicate when authentication of the identified client device should be revoked based on the authentication information and rules information, where the rules associated with the plurality of interested parties are reconciled when a conflict exists. The aggregator method further includes revoking authentication for the identified client device based on the criteria.

BRIEF DESCRIPTION OF THE FIGURES

The above and other features of the present disclosure, its nature and various advantages will be more apparent upon consideration of the following detailed description, taken in conjunction with the accompanying drawings in which.

DETAILED DESCRIPTION OF THE FIGURES

Figure 1:
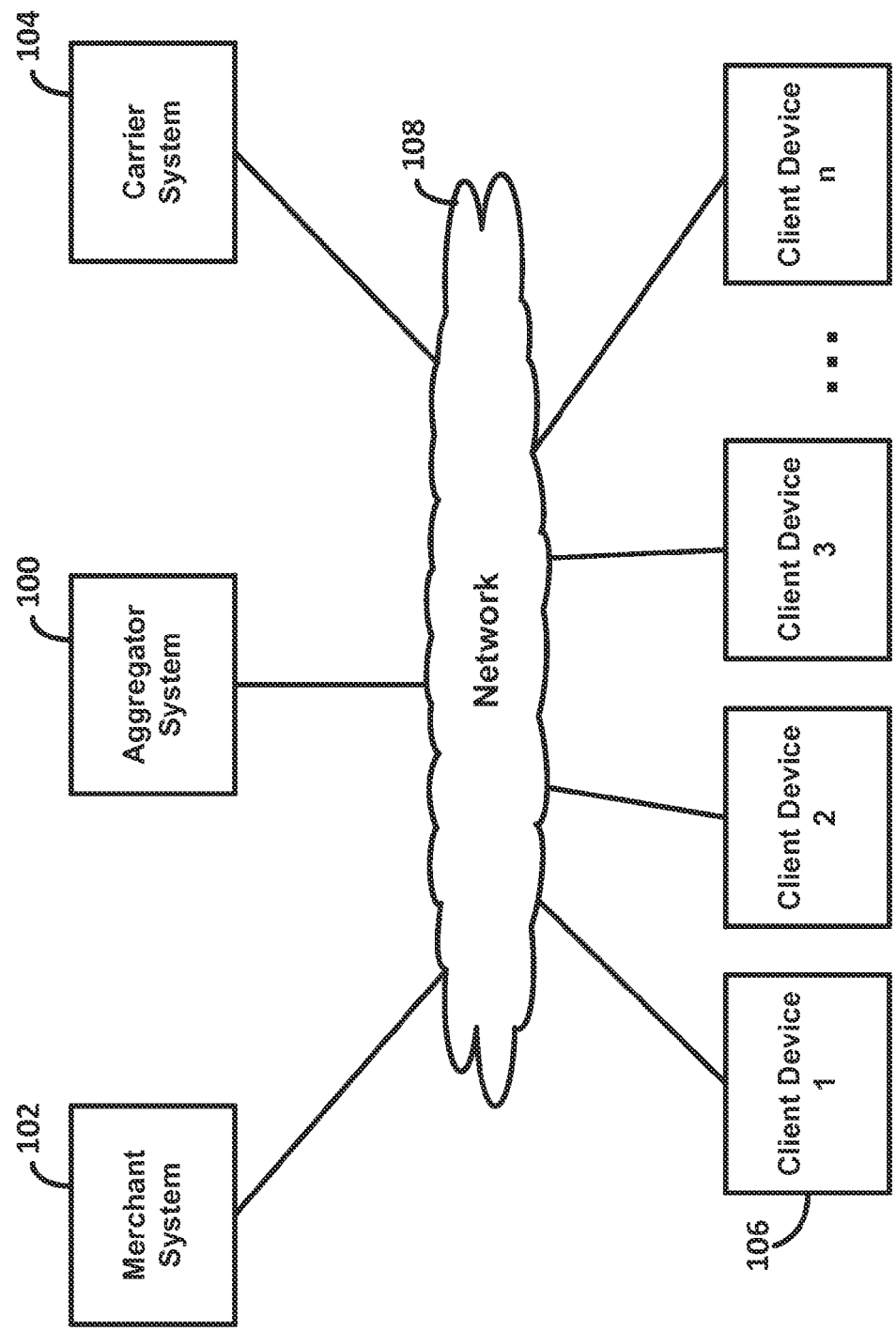
FIG. 1 is a block diagram of illustrative systems and devices implemented in a network environment in accordance with some embodiments of the present disclosure.

The present disclosure is directed towards defining criteria that indicate when authentication for an identified client device should be revoked based on rules associated with multiple interested parties. The criteria may include, for example, events, conditions, a set of conditions, or a combination thereof that may be identified by an aggregator system and that when identified indicate that authentication for an identified client device should be revoked. An authenticated client device may be allowed, for example, to make purchase transactions using protected information, such as customer relationship management (CRM) information stored at a carrier system. The client device may be, for example, a mobile phone owned by a user having an account with the carrier system. The carrier system provides mobile network services to the client device. In the United States, examples of carrier systems include systems operated by Verizon, AT&T, and Sprint, among others. CRM information, as referred to herein, is understood to refer to any suitable user-specific data, including personal information such as, for example, name, address, telephone number, payment information, client device location, distance between client device location and the location at which the client device was originally authenticated, any other suitable information, or any combination thereof. A carrier system typically stores CRM information associated with its users. The carrier system attempts to keep its stored CRM information secure, because of the sensitive nature of the personal information contained therein, by defining rules that indicate when a client device may be authenticated to receive and/or use the CRM information. Similarly, other interested parties such as merchant systems may attempt to provide security by defining rules that indicate when a client device may be authenticated to make a purchase from the merchant system, for example, using CRM information. In some circumstances, the rules associated with multiple interested parties may contradict one another. The aggregator system of the present disclosure may reconcile the rules associated with multiple interested parties when such a conflict exists. For example, a carrier system may be associated with a rule that indicates that authentication for a client device should be revoked twelve hours after the authentication was granted, a merchant system may be associated with a rule that indicates that authentication for a client device should be revoked twenty-four hours after the authentication was granted, and the aggregator system of the present disclosure may define criteria that indicate that authentication for a client device should be revoked twelve hours after the authentication was granted, based on the rules provided by the carrier system and the merchant system and a priority assigned to each.

In accordance with the present disclosure, a system is provided that is configured to define criteria that indicate when authentication of an identified client device should be revoked based on rules associated with interested parties, and to revoke the authentication based on the criteria. In some embodiments, this is accomplished by storing authentication information associated with an identified client device, storing rules of different rule types associated with a plurality of interested parties, where each rule is associated with a priority, and defining criteria based on the rules and the priority associated with each rule. In some embodiments, the defined criteria may include only one rule of each rule type. This allows client device authentication to be consistently managed when multiple interested parties are involved.

Criteria and rules may define any suitable events, conditions, set of conditions, or combination thereof that may be identified by an aggregator system and that when identified indicate that authentication for an identified client device should be revoked. An aggregator system may identify events, conditions, or a combination thereof using inputs, outputs, processing equipment, any suitable hardware or software, direct observation, computation, notification, a request for data, or any combination thereof. For example, a rule may indicate that authentication for an identified client device should be revoked twelve hours after the authentication is granted.

An authenticated client device may, for example, use CRM information accessed from the carrier system for any suitable purpose, including, for example, populating corresponding fields of a form to be electronically submitted to a merchant system as part of a transaction. As used herein, the term "transaction" shall be understood to include within its scope any suitable transaction, registration, any other suitable process, or any combination thereof.

FIG. 1 is a block diagram of illustrative systems and devices implemented in a network environment in accordance with some embodiments of the present disclosure. Aggregator system 100, merchant system 102, carrier system 104, and client device 106 may be coupled via network 108. Network 108 may include or communicate with any suitable one or more network structure or structures, such any suitable local area network (LAN), wide area network (WAN) (e.g., the internet), wireless local area network (WLAN), a mobile communications network, any other suitable network, or any combination thereof. In some embodiments, network 108 may be a carrier network provided and operated by carrier system 104. The lines coupling network 108 to the various systems and devices may represent a wireless coupling, a wired coupling, any other suitable coupling, or any combination thereof. For example, devices and systems may be connected to network 108 through a WiFi or Ethernet connection, with access to the internet. In another example, client device 106 may be coupled to network 108 using one or more mobile communications networks, such as a 3G, 4G, LTE, cellular network, any other suitable mobile communications network, or any combination thereof.

Aggregator system 100 may be any suitable system which acts as an intermediary between two or more systems, such as between client device 106 and carrier system 104, merchant system 102 and carrier system 104, client device 106 and merchant system 102, between any other systems and devices, or any combination thereof. Aggregator system 100 may act as an intermediary by facilitating the communication of information, such as payment information (e.g. credit card information, PayPal information, routing number data, bank account information, billing address, legal name, social security number, any other suitable information related to making a payment, or any combination thereof) and/or registration information (e.g., name, address, email, phone number, social security number, payment information, any other suitable information, or any combination thereof), between two systems. Aggregator system 100 may be trusted by carrier system 104, and may access CRM information stored in carrier system 104 for secure communication to merchant system 102 or client device 106. An example of aggregator system 100 is the system developed and operated by Danal Inc. (doing business as BilltoMobile) located in San Jose, Calif., which provides mobile payment services to merchants using data provided by United States carrier systems. In some embodiments of the present disclosure, aggregator system 100 may be configured to provide CRM information to client device 106 or merchant system 102 for use in a transaction via network 108.

Merchant system 102 may be any suitable one or more entities capable of entering into a transaction with a client device. Examples of a transaction include a purchase transaction for goods, services, or both provided by merchant system 102, a money transfer, a bill payment, a transaction that results in access to banking information, banking services, or both, any other suitable transaction, or any combination thereof. Merchant system 102 may include, for example, a web server that publishes a website which requires personal information (e.g., payment information, registration information). Examples of merchant system 102 include systems operated by Amazon.com, Citibank, freecreditscore.com, among others. In some embodiments, merchant system 102 may be configured to communicate with client device 106 (e.g., enable a transaction) using network 108.

Carrier system 104 may be any suitable system which provides mobile network services to client device 106. Providing mobile network services to client device 106 may include providing a carrier network to client device 106. For example, a carrier system may be a system operated by Verizon, Sprint, or AT&T.

Client device 106 is any suitable hardware, software, or both that can be used to conduct a transaction with merchant system 102 using the carrier network provided by carrier system 104. In some embodiments, a client device of the present disclosure may be a mobile phone. A mobile phone may be associated with a mobile phone number, a carrier system, any other mobile phone identification information, or any combination thereof. A client device may be a tablet device, laptop device, any other suitable client device, mobile or otherwise, or any combination thereof. In some embodiments, carrier system 104 may include or have access to CRM information associated with client device 106, and may be configured to communicate the CRM information to aggregator system 100 via network 108.

Figure 2:
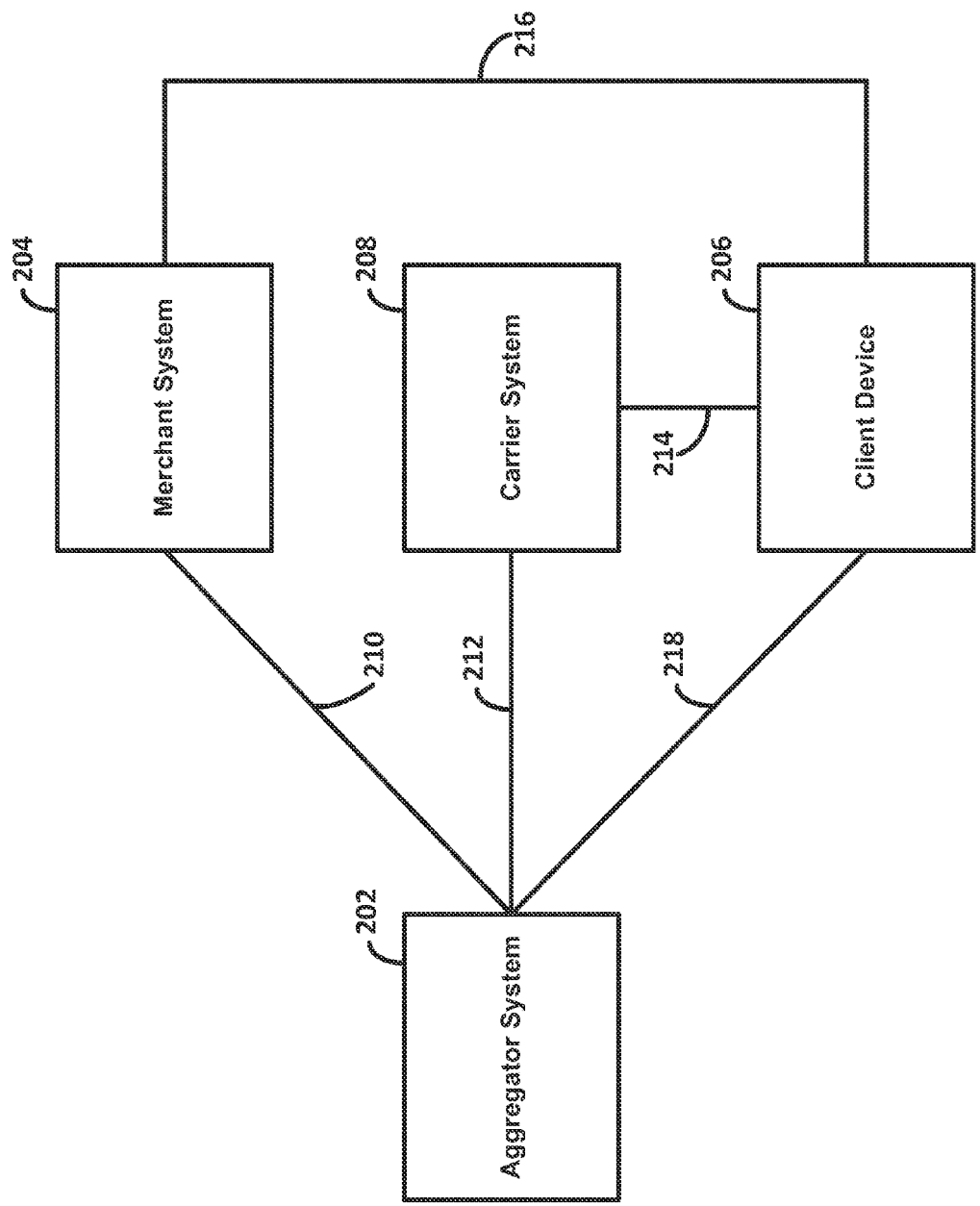
FIG. 2 is a block diagram showing illustrative paths of communication between systems and devices in accordance with some embodiments of the present disclosure.

FIG. 2 is block diagram showing illustrative paths of communication between the systems and devices of FIG. 1 in accordance with some embodiments of the present disclosure. Aggregator system 202 may be configured to communicate with merchant system 204, carrier system 208, and client device 206 via communications channels 210, 212, and 218 respectively. Merchant system 204 may be configured to communicate with aggregator system 202 and client device 206 via communication channels 210 and 218 respectively. Client device 206 may be configured to communicate with merchant system 204, aggregator system 202, and carrier system 208 via communication channels 216, 218, and 214 respectively. Carrier system 208 may be configured to communicate with aggregator system 202 and client device 206 via communication channels 212 and 214 respectively. Communication between systems and devices may include communicating over a network, such as network 108 of FIG. 1, and may include receiving data, sending data, or both.

Figure 3:
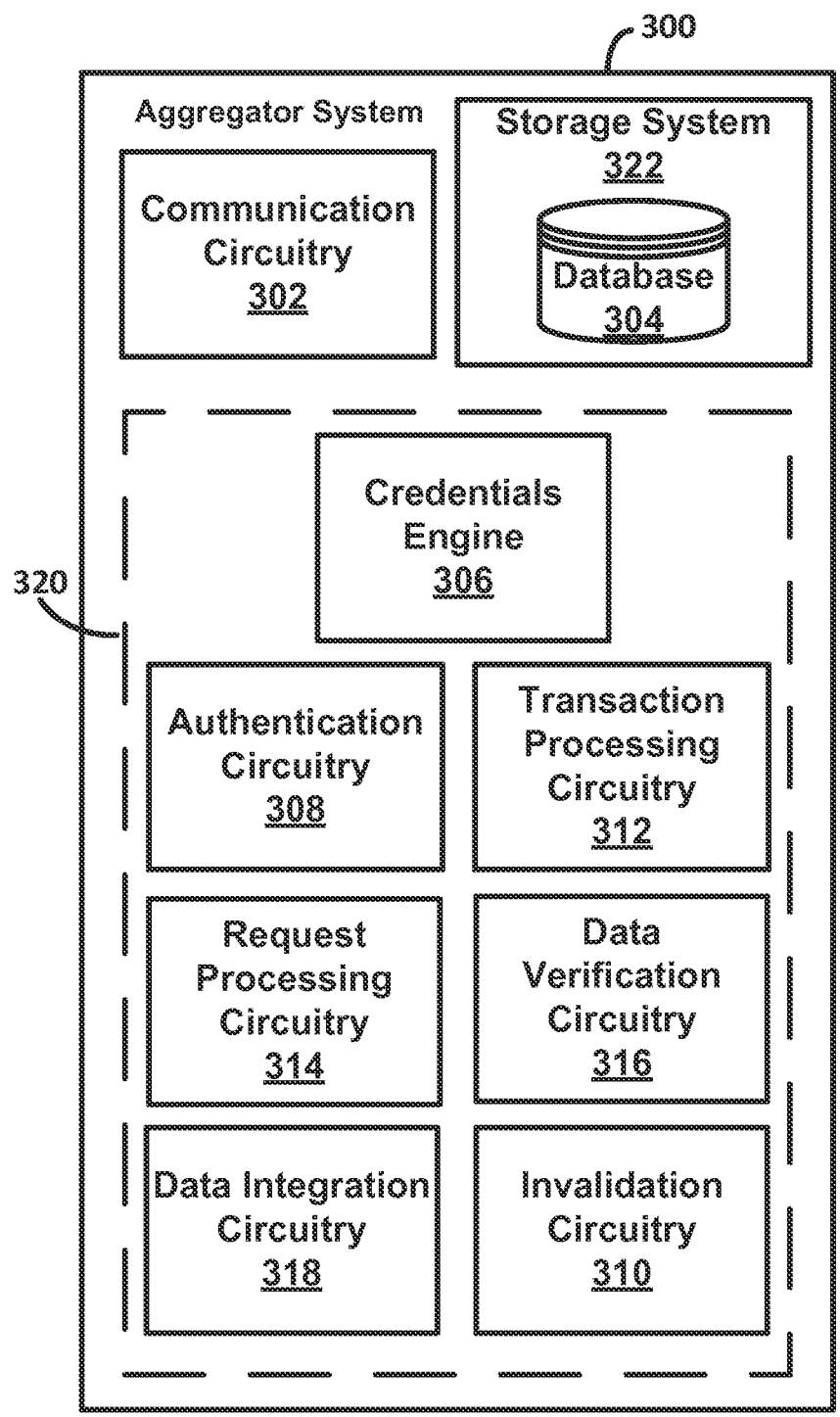
FIG. 3 is a block diagram of an illustrative aggregator system in accordance with some embodiments of the present disclosure.

FIG. 3 is a block diagram of illustrative aggregator system 300 in accordance with some embodiments of the present disclosure. Aggregator system 300 may be any suitable aggregator system, such as aggregator system 100 of FIG. 1 or aggregator system 202 of FIG. 2. In some embodiments, aggregator system 300 may be implemented in a network environment, such as that of FIG. 1. Aggregator system 300 may include any suitable software, hardware, or both configured to implement the features as described herein. For example, aggregator system 300 may include server hardware and software. Aggregator system 300 may include communication circuitry 302, storage system 322, and processing equipment 320.

Communication circuitry 302 may be configured with any suitable software, hardwired instructions, or both to communicate with database 304 and processing equipment 320, and may include inputs, outputs, any other mechanisms which facilitate communication with other systems and devices, or any combination thereof. An input or output is a relative communication channel that can be used to receive or send data, respectively. A communication channel may be established as, for example, an IP protocol-based communications session using any suitable network infrastructure, including the Internet, any proprietary LAN, WAN, any other suitable network infrastructure, or any combination thereof. Inputs and outputs can be implemented as one or more physical ports, a data storage device, any other suitable hardware interface, software interface, or any combination thereof. For example, aggregator system 300 may include a carrier input coupled to a carrier system and configured to receive data from the carrier system, a carrier output coupled to the carrier system and configured to output data to the carrier system, a merchant input coupled to a merchant system and configured to receive data from the merchant system, a merchant output coupled to the merchant system and configured to output data to the merchant system, a client device input coupled to a client device and configured to receive data from the client device, a client device output coupled to the client device and configured to output data to the client device, any other suitable input or output, or any combination thereof. While different inputs and outputs are described, it will be understood that they need not be separate components and two or more of the inputs and/or outputs may be implemented as a single component that can be used to send or receive data relative to more than one destination or source, respectively. For example, communication circuitry 302 may include a transceiver, such as an Ethernet card, or any other suitable device or circuitry which facilitates communication with other systems and devices.

Storage system 322 may include any suitable hardware, software, or both for implementing an organized data storage system capable of storing one or more databases and information related to, for example, merchant data, client device data, user data, authentication, rules, and carrier data. For example, storage system 322 may include database 304. In some embodiments, storage system 322 may store information which is not stored in database 304, such as information related to, for example application programming interfaces (APIs), HTML for content pages, any other suitable information, and any combination thereof.

Database 304 may include any suitable hardware, software, or both for implementing an organized data storage system capable of storing information related to, for example, merchant data, client device data, user data, authentication, rules, and carrier data. Information related to merchant data may include, for example, stock keeping units (SKUs) related to goods for sale, customer service contact information (e.g., a phone number, an email address, a hyperlink for a website), data related to criteria for revoking authentication, any other merchant data, or any combination thereof. Information related to client device data may include, for example, a mobile device number, identification information associated with a client device, any other client device data, or any combination thereof. Authentication information may include, for example, information associated with an identified client device that indicates that the client device has been authenticated. Rules information may include, for example, rules, each rule having a rule type and priority, where the rules are associated with interested parties. In some embodiments, database 304 may store encrypted information. For example, hashed information may be generated using a hash operation, and the hashed information may be stored in database 304.

Processing equipment 320 may be any suitable hardware, software, or both configured to process data received from other systems and devices (e.g., a client device, a merchant system, a carrier system, or any other suitable system or device), process data to be output to other systems and devices, generate data (e.g., generate authentication information), analyze data (e.g., rules), and perform other tasks. In some embodiments, processing equipment 320 may include one or more circuitries for performing the functionality as described herein, such as credentials engine 306, authentication circuitry 308, invalidation circuitry 310, transaction processing circuitry 312, request processing circuitry 314, data verification circuitry 316, data integration circuitry 318, any other suitable processing equipment, or any combination thereof. The circuitries within processing equipment 320 may communicate with one another to implement the features as described herein. Additionally, the circuitries within processing equipment 320 may all be implemented together on one or more devices. In some embodiments, processing equipment 320 may communicate with communication circuitry 302 and database 304 to retrieve or transmit information (e.g. identification information, authentication information, rules information, any other suitable information, or any combination thereof). For example, processing equipment 320 may send identifying information associated with a client device, such as a mobile phone number, to database 304 to retrieve authentication information related to the client device or user in possession of the client device.

Authentication circuitry 308 may be configured with any suitable software, hardwired instructions, or both to authenticate a client device. For example, authentication circuitry 308 may be at least a portion of one or more integrated circuit processors. In some embodiments, authenticating a client device may allow the client device to receive or request protected information (e.g., payment information), for example, as a part of a transaction. Authenticating a client device may include authenticating a user in possession of the client device. In some embodiments, authenticating a user in possession of a client device may include verifying the identity of the user. Verifying a user's identity may include, for example, requesting the user to provide uniquely identifying information, requesting the user to provide a unique one-time pin, requesting the user to send a particular mobile originated (MO) message, requesting the user to send a particular silent MO message, requesting the user to complete any other suitable request, or any combination thereof. In some embodiments, authenticating a client device may include comparing any provided information related to a user in possession of a client device to any information stored in database 304, for example, to detect differences between the provided information and the information stored in database 304. For example, authentication circuitry 308 may be configured to verify the identity of a user of a client device by requesting information such as a zip code from the user of the client device, and the information provided by the user may be verified against any previously received zip code information related to the user of the client device that is stored in database 304. In some embodiments, authentication circuitry 308 may be further configured to generate data which can be used to prove authentication, such as authentication keys (e.g., digital keys), credential information, any other suitable information, or any combination thereof. For example, authentication circuitry 308 may be configured to generate credentials for an authenticated user in possession of a client device.

Credentials engine 306 may be any suitable hardware, software, or both configured to determine criteria that indicate when authentication for an identified client device should be revoked. In some embodiments, an authenticated client device may be allowed to, for example, receive or request protected information (e.g., payment information), for example, as a part of a transaction. Criteria may include rules that specify events, conditions, a set of conditions, or a combination thereof that may be identified by an aggregator system and that when identified indicate that authentication for an identified client device should be revoked. Events may be, for example, an event identifying the client device as lost, an event identifying the client device as stolen, an event identifying a deactivated mobile number associated with the client device, an event identifying a fraud alert associated with the client device, any other suitable event, or any combination thereof. Conditions may be, for example, a predetermined time period after authentication of the client device is granted, a predetermined number of uses after authentication of the client device is granted, a change in information stored in database 304 that is associated with the client device after authentication is granted, a change in the identity of the carrier system associated with the client device after authentication is granted, a change of the client device after authentication is granted to the client device, a predetermined frequency of changes to the client device after authentication is granted to the client device, a predetermined frequency of changes in information stored in database 304 that is associated with the client device after authentication is granted, any other suitable condition, or any combination thereof. For example, criteria defined by credentials engine 306 may specify a condition that authentication for an identified client device should be revoked after it has been used to enable five purchase transactions on the client device. As another example, criteria defined by credentials engine 306 may specify that authentication for an identified client device should be revoked when an event occurs in which the identified client device is stolen.

Credential engine 306 may be configured to define criteria based on rules for revoking authentication that are associated with a plurality of interested parties. Interested parties may be any suitable entity from which information associated with the client device may be received, any suitable entity interested in protecting the information and functions available to the client device, or any suitable entity that otherwise has an interest in regulating use of the client device, or any combination thereof. Examples of interested parties include a carrier system that provides a carrier network on which the client device operates, a merchant system that enables transactions to be made on the client device, a financial institution that may provide financial services in connection with the use of the client device, a utility company that provides infrastructure that allows the client device to connect to a carrier network, a government organization such as a telecommunications regulatory organization that regulates the use of the client device, a school organization that is interested in protecting information available to the client device, a country in which the client device is being used, any other suitable entity, or any combination thereof. For example, credentials engine 306 may be configured to define criteria that indicate when authentication for a client device should be revoked based on a rule associated with a carrier system that indicates that authentication should be revoked twelve hours after it is granted, and based on a rule associated with a merchant system that indicates that authentication should be revoked after it is used to enable ten purchase transactions.

The rules associated with a plurality of interested parties may include different rules of different rule types. Rule types may include, for example, a predetermined time period, a predetermined number of uses, an event identifying the client device as lost, an event identifying the client device as stolen, an event identifying a deactivated mobile number associated with the client device, an event identifying a fraud alert associated with the client device, a detected change between previously stored hashed information associated with a client device and current hashed information associated with a client device, a predetermined change in phone device location, a client device arriving at or leaving a particular location, an unmatched gesture sequence as compared to a previously stored sequence (e.g., stored in aggregator system 300 or any other system), an unmatched fingerprint scan as compared to a previously stored fingerprint scan (e.g., stored in aggregator system 300 or any other system), an unmatched iris scan as compared to a previously stored iris scan (e.g., stored in aggregator system 300 or any other system), a detected blood alcohol level exceeding a predetermined limit, an unmatched DNA profile as compared to a previously stored profile (e.g., stored in aggregator system 300 or any other system), an unmatched vocal recognition pattern as compared to a previously stored pattern (e.g., stored in aggregator system 300 or any other system), an event identifying a change of account ownership associated with the client device, an event identifying that an account holder associated with a client device has deceased, an event identifying that an account associated with the client device has a payment status of past-due, an event identifying activation of a parental control associated with the client device, a predetermined number of transactions made on the client device in a predetermined time period, a predetermined number of transactions made on the client device with a given merchant system in a predetermined time period, a predetermined amount of total refunds granted to the client device in a predetermined time period, a predetermined amount of total refunds granted to the client device from a given merchant in a predetermined time period, a request by an account holder associated with the client device, a request by an interested party associated with the client device, any other suitable rule type, or any combination thereof. For example, a carrier system may be associated with a rule of a predetermined time period type that indicates that authentication should be revoked twelve hours after it is granted, and a merchant system may be associated with a rule of a predetermined number of uses type that indicates that authentication should be revoked after it is used to enable ten purchase transactions. As another example, aggregator system 300 may have previously received information related to a user's last name, have hashed the previously received information, presently receive information related to the user's last name in response to an attempt made by the user to authenticate a transaction, hash the presently received information, and compare the hashed presently received information to the hashed previously received information. In this example, a carrier system may be associated with a rule type that indicates that authentication should be revoked if the hashed presently received information does not match the hashed previously received information. As another example, a client device may be granted authentication keys that allow transactions to be made in some predetermined locations and prohibit transactions to be made in other predetermined locations, and a merchant system may be associated with a rule type that indicates that authentication should be revoked if a transaction is attempted on the client device in a predetermined location at which transactions are prohibited.

In some embodiments, credentials engine 306 may have a multi-dimensional framework such that criteria including only one rule of each rule type may be defined based on the plurality of interested parties and the multiple different rule types. For example, a carrier system may be associated with a rule of a predetermined period type that indicates that authentication should be revoked twelve hours after it is granted, a country associated with a client device may be associated with a different rule of predetermined period type that indicates that authentication should be revoked ten hours after it is granted, and credentials engine 306 may define criteria including only one rule of a predetermined period type that indicates that authentication should be revoked twelve hours after it is granted based on the rules associated with the carrier system and the country.

The rules associated with more than one interested parties may have a priority associated with each rule, and in some embodiments, credentials engine 306 may be configured to define criteria based on the priority associated with each rule. For example, if a merchant system and a financial institution each are associated with a different rule of the same rule type, credentials engine 306 may define criteria including only one rule of the rule type based on a priority assigned to each of the merchant system rule and the financial institution rule. A priority may be, for example, a number on a predetermined scale (e.g., 1-100), a verbal rank (e.g., high, medium, low), any other suitable priority, or any combination thereof. For example, a rule of type A associated with a merchant system may be assigned a priority of ten, a rule also of type A associated with a carrier system may be assigned a priority of fifty, and credentials engine 306 may be configured to define criteria that include the rule of type A associated with the carrier system because it has a higher assigned priority than the rule of type A associated with the merchant system. Credentials engine 306 may be configured to assign priority for a rule associated with an interested party with any suitable technique, for example, based on the secrecy of the information provided by the interested party, based on a contract between the interested party and aggregator system 300, based on the rule associated with the interested party, based on any other suitable information, or any combination thereof.

In some embodiments, credentials engine 306 may be configured to determine one or more rules associated with a combination of two or more interested parties, and determine a priority for the one or more rules. For example, a rule that indicates that authentication should be revoked twenty hours after it is granted associated with a merchant system may be assigned a priority of ten, a rule that indicates that authentication should be revoked ten hours after it is granted associated with a carrier system may be assigned a priority of fifty, and credentials engine may be configured to define a rule for the combination of the merchant system and the carrier system that indicates that authentication should be revoked twelve hours after it is granted to the client device, where the rule for the combination of the merchant system and the carrier system is assigned a priority of seventy. Credentials engine 306 may be configured to define criteria with any suitable technique, for example, by selecting one rule of each type from the rules associated with individual and combined interested parties, based on the priority associated with each rule. For example, a carrier system may be associated with a rule that indicates that authentication should be revoked ten hours after it is granted to the client device, a merchant system may be associated with a rule that indicates that authentication should be revoked twenty hours after it is granted to the client device, the combination of the merchant system and the carrier system may be associated with a rule that indicates that authentication should be revoked fourteen hours after it is granted to the client device, and credential engine 306 may be configured to define criteria that include a rule that indicates that authentication should be revoked fourteen hours after it is granted to the client device based on a priority associated to each of the carrier system, the merchant system, and the combination of the carrier system and the merchant system.

Invalidation circuitry 310 may be configured with any suitable software, hardwired instructions, or both to revoke authentication for a client device. For example, invalidation circuitry 310 may be at least a portion of one or more integrated circuit processors. Revoking authentication for an identified client device may prevent the client device from engaging in interactions which require authentication (e.g., requesting protected information for use in a transaction). In some embodiments, revoking authentication for an identified client device may include invalidating credentials for an authenticated user in possession of the client device. In some embodiments, invalidation circuitry 310 may receive instructions to revoke authentication for an identified user device when criteria (e.g., events, conditions, or both) defined by credentials engine 306 have been identified. The aggregator system of the present invention may, for example, regularly check data relating to conditions defined by credentials engine 306 to determine when a condition has been met, and may receive event notifications from other systems indicating when an event has occurred. In some embodiments, events may occur when an event notification matching an event is received, for example, by communication circuitry 302. For example, credentials engine 306 may define an event criterion indicating that authentication for an identified client device should be revoked if the identified client device is lost or stolen, and invalidation circuitry 310 may revoke authentication for the identified client device when an event notification that identifies the client device as lost or stolen is received by communication circuitry 302. In other embodiments, condition criteria may be met when data associated with the authentication of an identified client device matches a condition. For example, credentials engine 306 may define a condition criterion indicating that authentication for an identified client device should be revoked 24 hours after the authentication was granted to the identified client device, and invalidation circuitry 310 may revoke authentication for the identified client device when data associated with the authentication indicates that it has been 24 hours since the authentication was granted.

Transaction processing circuitry 312 may be configured with any suitable software, hardwired instructions, or both to process a transaction on a client device, such as client device 106 of FIG. 1. For example, transaction processing circuitry 312 may be at least a portion of one or more integrated circuit processors. In some embodiments, transaction processing circuitry 312 may use information stored in database 304 to process a transaction. Processing a transaction may include, for example, submitting payment information, completing a sale, any other suitable process, or any combination thereof. For example, a user attempting to make a purchase transaction on a client device may be redirected from a webpage of a merchant system to a webpage associated with aggregator system 300, and transaction processing circuitry 312 may process the purchase transaction.

Request processing circuitry 314 may be configured with any suitable software, hardwired instructions, or both to process requests from other systems and devices, such as merchant system 102 of FIG. 1, carrier system 104 of FIG. 1, and client device 106 of FIG. 1. For example, request processing circuitry 314 may be at least a portion of one or more integrated circuit processors. Requests may include a request to output information, a request to accept information, such as a rule, a request to validate information, a request to process a transaction, any other suitable request, or any combination thereof. In some embodiments, one or more requests may be received by communication circuitry 302, and passed from communication circuitry 302 to request processing circuitry 314. Request processing circuitry 314 may determine any suitable response to each of the one or more requests, such as processing information, retrieving information, transmitting information, any other suitable response, or any combination thereof. In some embodiments, request processing circuitry 314 may be configured to process and/or respond to requests received from other circuitries within processing equipment 320. For example, request processing circuitry 314 may receive a request for information associated with a client device, and may in response retrieve information from database 304 and communicate the information to communication circuitry 302 to be output.

Data verification circuitry 316 may be configured with any suitable software, hardwired instructions, or both to verify information associated with a client device, such as client device 106 of FIG. 1. For example, data verification circuitry 316 may be at least a portion of one or more integrated circuit processors. In one embodiment, aggregator system 300 may receive information associated with a client device from one or more sources, and data verification circuitry 316 may be configured to verify the information. In another embodiment, request processing circuitry 314 may receive a request from a merchant system to verify information associated with a client device, and data verification circuitry 316 may verify the information. Verification may include comparing received information to information stored in database 304, comparing received information to information received from one or more sources, deterministic matching, probabilistic matching, fuzzy matching, any other suitable verification technique, or any combination thereof. In some embodiments, verifying information associated with a client device may include verifying information associated with a user in possession of the client device. In some embodiments, data verification circuitry 316 may be configured to compare hashed information associated with a client device that is stored in database 304 with hashed information associated with the client device that was received at a different time and that is also stored in database 304, to detect a change in the information associated with the client device.

Data integration circuitry 318 may be configured with any suitable software, hardwired instructions, or both to integrate information associated with a client device which is received from one or more sources. For example, data integration circuitry 318 may be at least a portion of one or more integrated circuit processors. In one embodiment, aggregator system 300 may receive information associated with a client device from one or more sources, and data integration circuitry 318 may integrate the data received from the one or more sources. Data integration may include, for example, eliminating inconsistencies between information from different sources or between information received from one source and information stored in a database (e.g., database 304), eliminating duplicate information from different sources or between information received from one source and information stored in a database (e.g., database 304), any other suitable integration technique, or any combination thereof. Sources may include interested parties such as, for example, carrier systems, financial institutions, utility companies, government organizations, universities, schools, any other suitable sources, or any combination thereof.

Figure 4:
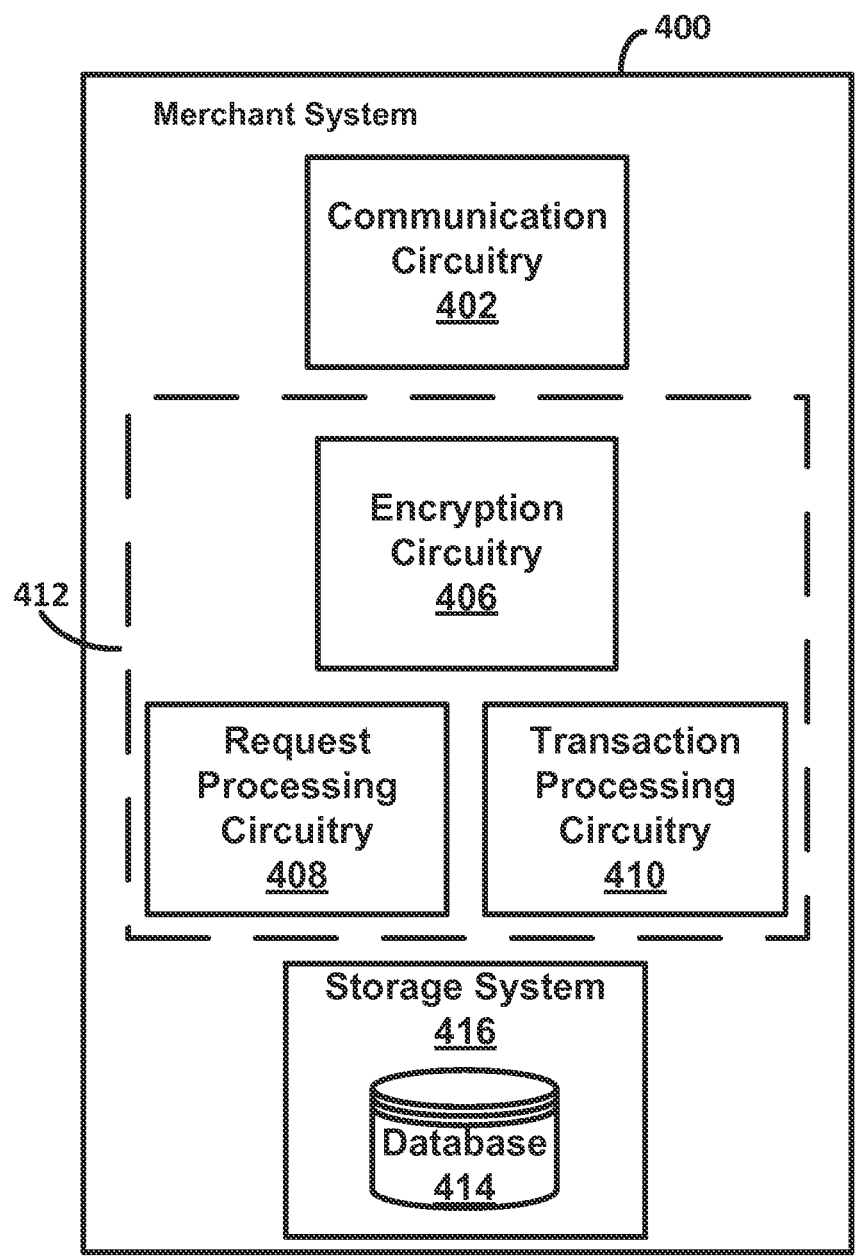
FIG. 4 is a block diagram of an illustrative merchant system in accordance with some embodiments of the present disclosure.

FIG. 4 is a block diagram of illustrative merchant system 400 in accordance with some embodiments of the present disclosure. Merchant system 400 may be any suitable merchant system, for example, merchant system 102 of FIG. 1 or merchant system 204 of FIG. 2. In some embodiments, merchant system 400 may be implemented in a network environment, such as that of FIG. 1. Merchant system 400 may include any suitable software, hardware, or both configured to implement the features as described herein. For example, merchant system 400 may include server hardware and software. Merchant system 400 may include communication circuitry 402, storage system 416, and processing equipment 412.

Communication circuitry 402 may be configured with any suitable software, hardwired instructions, or both to communicate with database 414 and processing equipment 412, and may include inputs, outputs, any other mechanisms which facilitate communication with other systems and devices, or any combination thereof. An input or output is a relative communication channel that can be used to receive or send data, respectively. A communication channel may be established as, for example, an IP protocol-based communications session using any suitable network infrastructure, including the Internet, any proprietary LAN, WAN, any other suitable network infrastructure, or any combination thereof. Inputs and outputs can be implemented as one or more physical ports, a data storage device, any other suitable hardware interface, software interface, or any combination thereof. For example, merchant system 400 may include a carrier input coupled to a carrier system and configured to receive data from the carrier system, a carrier output coupled to the carrier system and configured to output data to the carrier system, an aggregator input coupled to an aggregator system and configured to receive data from the aggregator system, an aggregator output coupled to the aggregator system and configured to output data to the aggregator system, a client device input coupled to a client device and configured to receive data from the client device, a client device output coupled to the client device and configured to output data to the client device, any other suitable input or output, or any combination thereof. In the context of the present disclosure, it may be preferential for merchant system 400 to not include a carrier input and a carrier output. That is, merchant system 400 need not be able to communicate with a carrier system in preferred embodiments of the present invention. While different inputs and outputs are described, it will be understood that they need not be separate components and two or more of the inputs and/or outputs may, indeed be implemented as a single component that can be used to send or receive data relative to more than one destination or source, respectively. For example, communication circuitry 402 may include a transceiver, such as an Ethernet card, or any other suitable device or circuitry which facilitates communication with other systems and devices.

Storage system 416 may include any suitable hardware, software, or both for implementing an organized data storage system capable of storing one or more databases and information related to, for example, merchant data, client device data, user data, authentication, rules, and carrier data. For example, storage system 416 may include database 414. In some embodiments, storage system 416 may store information which is not stored in database 414, such as information related to merchant data, for example APIs, HTML for content pages, any other suitable information, and any combination thereof. In some embodiments, merchant system 400 may be configured to communicate any information stored in storage system 416 or in database 414 to a trusted aggregator system, such as aggregator system 300.

Database 414 may include any suitable hardware, software, or both for implementing an organized data storage system capable of storing information related to, for example, merchant data, client device data, user data, rules data, and carrier data. Information related to merchant data may include, for example, SKUs related to goods for sale, customer service contact information (e.g., a phone number, an email address, a hyperlink for a website), merchant identification information, payload information, data related to criteria for revoking authentication, any other merchant data, or any combination thereof. Information related to client device data may include, for example, a mobile device number, identification information associated with a client device, any other client device data, or any combination thereof. Information related to user data may include, for example, authentication information for an authenticated user, credential information for an authenticated user, any other user related information, or any combination thereof. Rules data may include, for example, rules associated with an identified client device that indicate when authentication for the client device should be revoked. Carrier data may include, for example, the carrier network associated with a client device. In some embodiments, database 414 may store information in an encrypted form. For example, hashed information may be generated using a hash operation, and the hashed information may be stored in database 414.

Processing equipment 412 may be any suitable hardware, software, or both configured to process data received from other systems and devices (e.g., a client device, an aggregator system, or any other suitable system or device), process data to be output to other systems and devices, generate data, analyze data (e.g., confirm authentication information provided by a client device), and perform other tasks. In some embodiments, processing equipment 412 may include one or more circuitries for performing the functionality as described herein, encryption circuitry 406, request processing circuitry 408, transaction processing circuitry 410, any other suitable processing equipment, or any combination thereof. The circuitries within processing equipment 412 may communicate with one another to implement the features described herein. Additionally, the circuitries within processing equipment 412 may all be implemented together on one or more devices. Processing equipment 412 may communicate with communication circuitry 402 and database 414 to retrieve and/or transmit information. For example, processing equipment 412 may retrieve credential information associated with a user in possession of a client device from database 414 before allowing a transaction to be made on the client device.

Encryption circuitry 406 may be configured with any suitable software, hardwired instructions, or both to encrypt, decrypt, or both information such as, for example, a payload, information to be stored in database 414, any other suitable information, or any combination thereof. For example, encryption circuitry 406 may be at least a portion of one or more integrated circuit processors. Encrypting information may protect the information from being stolen, hacked, or otherwise leaked to a source which does not have permission to access the information. In some embodiments, information may be encrypted using an encryption key, such as a symmetric key, an asymmetric key, any other suitable encryption method, or any combination thereof. For example, an aggregator system may provision a merchant system with an encryption key, and the merchant system may use the encryption key to encrypt information. In some embodiments, the advanced encryption standard (AES), or any other suitable strong symmetric-key block cipher, should be used when information is encrypted by encryption circuitry 406. In some embodiments, information to be encrypted may include a payload generated by merchant system 400. Merchant system 400 may pass a payload encrypted by encryption circuitry 406 to a client device, and the encrypted payload may facilitate client-initiated interaction between a client device and an aggregator system. An encrypted payload may be unique for a client device, but not unique for each request made by the client device.

Request processing circuitry 408 may be configured with any suitable software, hardwired instructions, or both to process requests from other systems and devices, for example, carrier system 104 of FIG. 1, aggregator system 100 of FIG. 1, or client device 106 of FIG. 1. For example, request processing circuitry 408 may be at least a portion of one or more integrated circuit processors. Requests may include a request to output information (e.g., identification information or authentication information), a request to accept information, any other suitable request, or any combination thereof. In some embodiments, one or more requests may be received by communication circuitry 402 and passed from communication circuitry 402 to request processing circuitry 408. Request processing circuitry 408 may determine an appropriate response to each of the one or more requests, for example, processing information, generating information, analyzing information, communicating with another circuitry within processing equipment 412, transmitting data to database 414, receiving data from database 414, any other appropriate response, or any combination thereof. In some embodiments, request processing circuitry may process, respond to, or both, requests received from other circuitries within processing equipment 412.

Transaction processing circuitry 410 may be configured with any suitable software, hardwired instructions, or both to process a transaction made on a client device. For example, transaction processing circuitry 410 may be at least a portion of one or more integrated circuit processors. Processing a transaction may include, for example, submitting payment information, completing a sale, any other suitable process, or any combination thereof. A transaction may be a purchase transaction, a registration, any other suitable process, or any combination thereof. In some embodiments, transaction processing circuitry 410 may use data stored in database 414 to process a transaction. In other embodiments, transaction processing circuitry 410 may use data received from another system, such as an aggregator system, to process a transaction. For example, a client device may visit a website published by merchant system 400 to make a purchase transaction, and merchant system 400 may receive information from an aggregator system, such as aggregator system 100 of FIG. 1, to process the purchase transaction. In some embodiments, transaction processing circuitry 410 may prepopulate transaction data fields with information received from another system or device, or information received from database 414.

Figure 5:
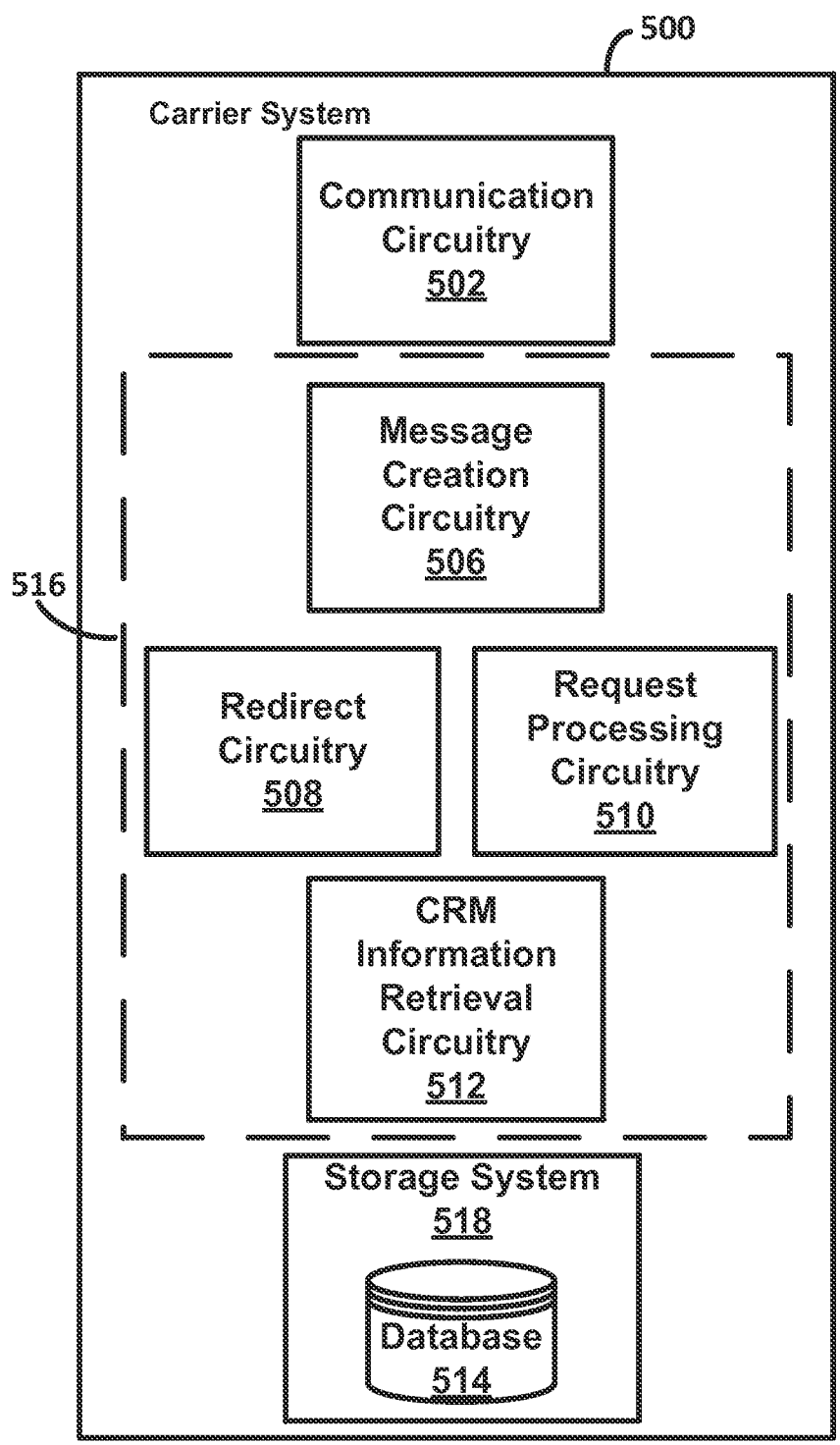
FIG. 5 is a block diagram of an illustrative carrier system in accordance with some embodiments of the present disclosure.

FIG. 5 is a block diagram of illustrative carrier system 500 in accordance with some embodiments of the present disclosure. Carrier system 500 may be any suitable carrier system, such as carrier system 208 of FIG. 2 or carrier system 104 of FIG. 1. In some embodiments, carrier system 500 may be implemented in a network environment, such as that of FIG. 1. Carrier system 500 may include any suitable software, hardware, or both configured to implement the features as described herein. For example, carrier system 500 may include server hardware and software. Carrier system 500 may include communication circuitry 502, storage system 518, and processing equipment 516.

Communication circuitry 502 may be configured with any suitable software, hardwired instructions, or both to communicate with database 514 and processing equipment 516, and may include inputs, outputs, any other mechanisms which facilitate communication with other systems and devices, or any combination thereof. An input or output is a relative communication channel that can be used to receive or send data, respectively. A communication channel may be established as, for example, an IP protocol-based communications session using any suitable network infrastructure, including the Internet, any proprietary LAN, WAN, any other suitable network infrastructure, or any combination thereof. Inputs and outputs can be implemented as one or more physical ports, a data storage device, any other suitable hardware interface, software interface, or any combination thereof. For example, carrier system 500 may include an aggregator input coupled to an aggregator system and configured to receive data from the aggregator system, an aggregator output coupled to the aggregator system and configured to output data to the aggregator system, a merchant input coupled to a merchant system and configured to receive data from the merchant system, a merchant output coupled to the merchant system and configured to output data to the merchant system, a client device input coupled to a client device and configured to receive data from the client device, a client device output coupled to the client device and configured to output data to the client device, any other suitable input or output, or any combination thereof. In the context of the present disclosure, it may be preferential for carrier system 500 to not include a merchant system input and a merchant system output. That is, carrier system 500 need not be able to communicate with a merchant system in preferred embodiments of the present invention. While different inputs and outputs are described, it will be understood that they need not be separate components and two or more of the inputs and/or outputs may, indeed be implemented as a single component that can be used to send or receive data relative to more than one destination or source, respectively. For example, communication circuitry 502 may include a transceiver, such as an Ethernet card, or any other suitable device or circuitry which facilitates communication with other systems and devices.

Storage system 518 may include any suitable hardware, software, or both for implementing an organized data storage system capable of storing one or more databases and information related to, for example, account data, rules, and CRM information associated with a user in possession of a client device. For example, storage system 518 may include database 514. In some embodiments, storage system 518 may store information which is not stored in database 514, and carrier system 500 may be configured to communicate such information to a trusted aggregator system, such as aggregator system 300.

Database 514 may include any suitable hardware, software, or both for implementing an organized data storage system capable of storing information related to, for example, account data, rules, and CRM information associated with a user in possession of a client device. Rules information may include, for example, events, conditions, a set of conditions, or a combination thereof that may be identified by an aggregator system and that when identified indicate that authentication for an identified client device should be revoked. In some embodiments, database 514 may store information in an encrypted form. For example, hashed information may be generated using a hash operation, and the hashed information may be stored in database 514.

Processing equipment 516 may be any suitable hardware, software, or both configured to process data received from other systems and devices (e.g., a client device, an aggregator system, or any other suitable system or device), process data to be output to other systems and devices (e.g., CRM information), and perform other tasks. In some embodiments, processing equipment 516 may include one or more circuitries for performing the functionality as described herein, such as message creation circuitry 506, redirect circuitry 508, request processing circuitry 510, CRM information retrieval circuitry 512, any other suitable processing equipment, or any combination thereof. The circuitries within processing equipment 516 may communicate with one another to implement the features as described herein. Additionally, the circuitries within processing equipment 516 may all be implemented together on one or more devices. Processing equipment 516 may be configured to communicate with communication circuitry 502 and database 514 to retrieve and/or transmit information related to user account data, CRM information, any other information, or any combination thereof.

Message creation circuitry 506 may be configured with any suitable software, hardwired instructions, or both to create a message such as, for example, a short message service (SMS) message, a silent SMS message, any other suitable type of message, or any combination thereof. For example, message creation circuitry 506 may be at least a portion of one or more integrated circuit processors. In some embodiments, message creation circuitry 506 may be configured to generate an SMS message in response to a request from another system or device, such as aggregator system 100 of FIG. 1 or client device 106 of FIG. 1. For example, carrier system 500 may receive a request to generate an SMS message and send it to a client device, and message creation circuitry may create the SMS message and may specify that the message should be sent to the mobile phone number of the client device.

Redirect circuitry 508 may be configured with any suitable software, hardwired instructions, or both to redirect, for example, a request, information, or both from one system to another system. For example, redirect circuitry 508 may be at least a portion of one or more integrated circuit processors. In some embodiments, redirect circuitry 508 may be configured to redirect an SMS message from one system or device to another system or device. In other embodiments, redirect circuitry 508 may be configured to perform an http redirect from a website associated with one system to a website associated with another system. Redirect circuitry 508 may additionally be configured to perform any other suitable redirect from one system to another system. In some embodiments, redirect circuitry 508 may receive instructions which cause the redirect to be performed. In some embodiments, redirect circuitry 508 may receive such instructions from request processing circuitry 410.

Request processing circuitry 510 may be configured with any suitable software, hardwired instructions, or both to process requests from other systems and devices, for example, aggregator system 100 of FIG. 1 or client device 106 of FIG. 1. For example, request processing circuitry 510 may be at least a portion of one or more integrated circuit processors. Requests may include a request for information, such as user account information, rules information, CRM information, any other suitable request, or any combination thereof. One or more requests may be received by communication circuitry 502 and passed from communication circuitry 502 to request processing circuitry 510. Request processing circuitry 510 may determine a suitable response to each of the one or more requests, such as processing information, communicating with another circuitry within processing equipment 516, transmitting data to database 514, receiving data from database 514, any other appropriate response, or any combination thereof. In some embodiments, request processing circuitry 510 may process, respond, or both to requests received from other circuitries within processing equipment 516.

CRM information retrieval circuitry 512 may be configured with any suitable software, hardwired instructions, or both to retrieve CRM information associated with a client device. For example, CRM information retrieval circuitry 512 may be any at least a portion of one or more integrated circuit processors. In some embodiments, CRM information may include information related to an account associated with a user in possession of a client device (e.g., payment information, name, address, social security number, etc.), or any other suitable information which may be obtained through interactions between carrier system 500 and a client device. It should be understood that protected information associated with a user, such as a social security number, may only be accessed by trusted systems and devices to which permission has been granted by the user. CRM information retrieval circuitry 512 may be configured to retrieve appropriate CRM information from database 514. In some embodiments, CRM information retrieval circuitry 512 may be configured to retrieve appropriate CRM information in response to a request received from request processing circuitry 510. For example, an aggregator system, such as aggregator system 100 of FIG. 1, may request CRM information associated with an identified client device from carrier system 500, and CRM information retrieval circuitry 512 may retrieve the requested CRM information and provide it to communication circuitry 502 to be output to the aggregator system.

Figure 6:
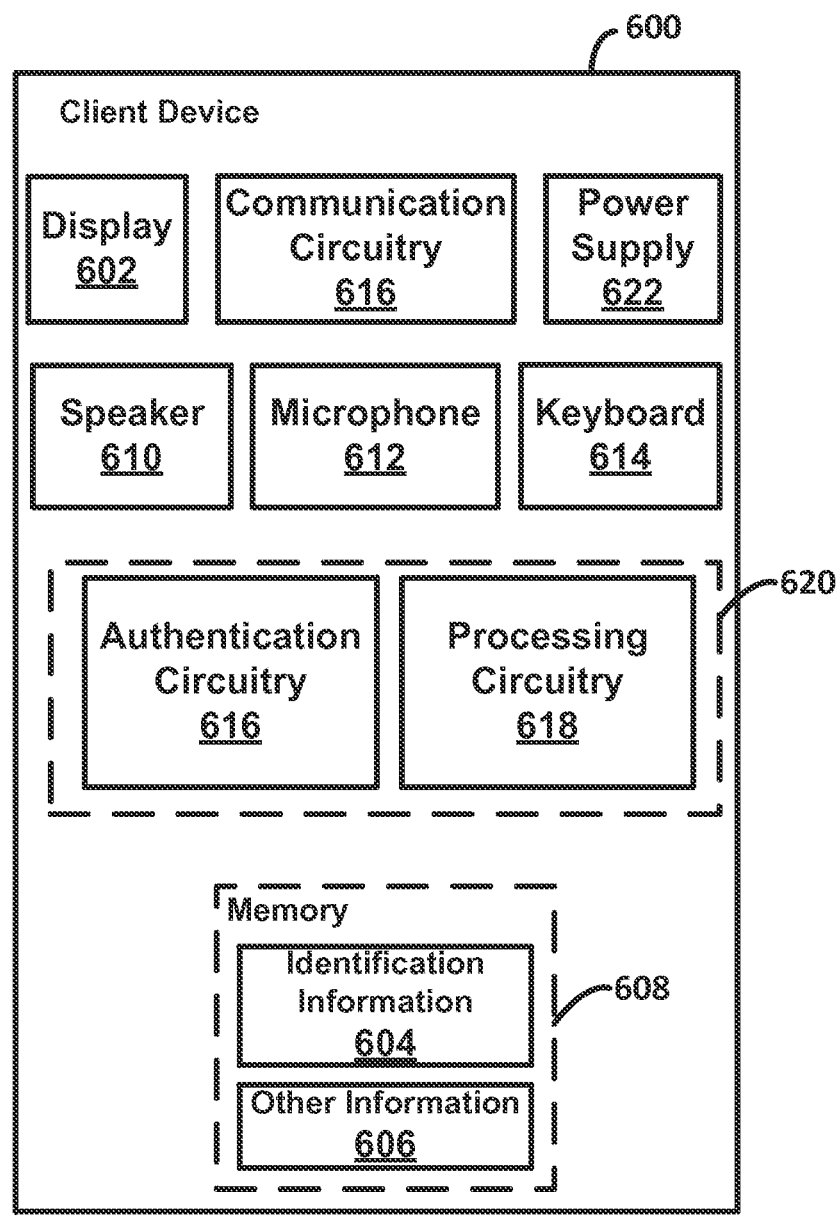
FIG. 6 is a block diagram of an illustrative client device in accordance with some embodiments of the present disclosure.

FIG. 6 is a block diagram of illustrative client device 600 in accordance with some embodiments of the present disclosure. Client device 600 may be any suitable client device, such as client device 206 of FIG. 2 or client device 106 of FIG. 1. In some embodiments client device 600 may be implemented in a network environment, such as that of FIG. 1. Client device 600 may include any suitable software, hardware, or both configured to implement the features as described herein. Client device 600 may include display 602, communication circuitry 616, power supply 622, speaker 610, microphone 612, keyboard 614, memory 608, and processing equipment 620.

Display 602 may be configured to display any information stored on or received by client device 600 in any suitable format. Information displayed may include, for example, information requested by a user of client device 600, information related to client device 600, information related to a transaction, information related to an mobile application, information received from another system or device, information to be sent to another system or device, an SMS message, any other suitable information, or any combination thereof. Display 602 may be, for example, a flat panel display such as a liquid crystal display, plasma display, any other suitable display, or any combination thereof.

Power supply 622 may be configured to supply power to client device 600. Power supply 622 may be any suitable internal or external power source such as, for example, a battery.

Speaker 610 may be configured to provide audible sound. The audible sound may be related to a phone call on client device 600, an application running on client device 600, an alarm set on client device 600, a transaction, any other suitable process or application, or any combination thereof.

Microphone 612 may be configured to receive user input such as, for example, audible user input. The inputs received by microphone 612 may include information related to, for example, a phone call on client device 600, a user in possession of client device 600, a transaction, any other suitable information, or any combination thereof.

Keyboard 614 may be configured to receive user input such as, for example, text input. The inputs received by keyboard 614 may be information related to, for example, a message stored on or created on client device 600, a user in possession of client device 600, a transaction, any other suitable information, or any combination thereof.

Communication circuitry 616 may include inputs, outputs, any other mechanisms which facilitate communication with other systems and devices, or any combination thereof. Communication circuitry 616 may be configured with any suitable software, hardwired instructions, or both. An input or output is a relative communication channel that can be used to receive or send data, respectively. A communication channel may be established as, for example, an IP protocol-based communications session using any suitable network infrastructure, including the Internet, any proprietary LAN, WAN, any other suitable network infrastructure, or any combination thereof. Inputs and outputs can be implemented as one or more physical ports, a data storage device, any other suitable hardware interface, software interface, or any combination thereof. For example, client device 600 may include a carrier input coupled to a carrier system and configured to receive data from the carrier system, a carrier output coupled to the carrier system and configured to output data to the carrier system, a merchant input coupled to a merchant system and configured to receive data from the merchant system, a merchant output coupled to the merchant system and configured to output data to the merchant system, an aggregator input coupled to an aggregator system and configured to receive data from the aggregator system, an aggregator output coupled to the aggregator system and configured to output data to the aggregator system, any other suitable input or output, or any combination thereof. While different inputs and outputs are described, it will be understood that they need not be separate components and two or more of the inputs and/or outputs may, indeed be implemented as a single component that can be used to send or receive data relative to more than one destination or source, respectively. For example, communication circuitry 616 may include a transceiver, such as an Ethernet card, or any other suitable device or circuitry which facilitates communication with other systems and devices. Communication circuitry 616 may be configured to communicate with memory 608, processing equipment 620, speaker 610, microphone 612, keyboard 614, power supply 622, and display 602.

Memory 608 may be one or more suitable memory devices such as, for example, a hard disk drive, flash memory, random access memory (RAM), an optical disk, any other suitable memory device, or any combination thereof. Memory 608 may include identification information 604 and other information 606. Identification information 604 may include any suitable identification information related to client device 600. For example, identification information 604 may include information identifying hardware or software of client device 600, information identifying a mobile phone number associated with client device 600, information identifying a device model of client device 600, information identifying a user in possession of client device 600, information identifying a carrier system associated with client device 600, any other suitable identification information, or any combination thereof. Other information 606 may include any information stored in memory 608 other than identification information 604. For example, other information 606 may store information related to applications, messaging, photos and videos, transactions, merchants, networks, capacity and storage, any other suitable information, or any combination thereof.

Processing equipment 620 may be any suitable hardware, software, or both configured to process data received from other systems and devices (e.g., a merchant system, a carrier system, an aggregator system, or any other suitable system or device), process data to be output to other systems and devices, process data related to mobile applications, and perform other tasks. In some embodiments, processing equipment 620 may include one or more circuitries for performing the functionality as described herein, such as authentication circuitry 616, processing circuitry 618, any other suitable processing equipment, or any combination thereof. The circuitries within processing equipment 620 may communicate with one another to implement the features as described herein. Additionally, the circuitries within processing equipment 620 may all be implemented together on one or more devices. Processing equipment 620 may be configured to communicate with communication circuitry 616, memory 608, speaker 610, microphone 612, keyboard 614, power supply 622, and display 602.

Authentication circuitry 616 may be configured with any suitable software, hardwired circuitry, or both to authenticate client device 600. For example, authentication circuitry 616 may be at least a portion of one or more integrated circuit processors. In some embodiments, authenticating client device 600 may include authenticating a user in possession of client device 600. In some embodiments, authentication circuitry 616 may communicate with a system, such as a merchant system or an aggregator system, via communication circuitry 616, in order to authenticate client device 600. Authenticating client device 600 may include prompting a user in possession of client device 600 to input information. Information may be input via display 602, keyboard 614, microphone 612, any other suitable user input, or any combination thereof. Information may include, for example, uniquely identifying information related to the user in possession of client device 600. In some embodiments, authentication circuitry 616 may communicate with memory 608 to authenticate client device 600. For example, memory 608 may store information received from an aggregator system, such as aggregator system 100 of FIG. 1, and subsequent to prompting a user in possession of client device 600 for information, authentication circuitry 616 may compare the entered information to that stored in memory 608.

Processing circuitry 618 may be configured with any suitable software, hardwired instructions, or both to implement any features other than authentication. For example, processing circuitry 608 may be at least a portion of one or more integrated circuit processors. For example, processing circuitry 618 may be configured to run applications, to compute information, to process instructions, to carry out functions related to client device operation, to carry out any other suitable operation or implementation, or any combination thereof.

Figure 7:
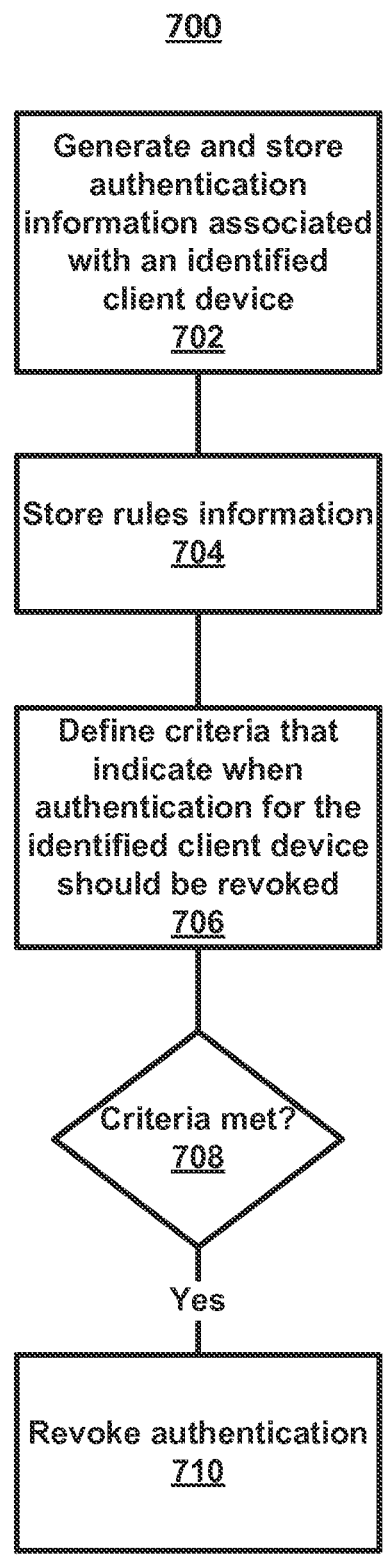
FIG. 7 is a flow diagram including illustrative steps for defining criteria that indicate when authentication for a client device should be revoked and revoking authentication in accordance with some embodiments of the present disclosure.

FIG. 7 is a flow diagram including illustrative steps for defining criteria that indicate when authentication for a client device should be revoked and revoking authentication in accordance with some embodiments of the present disclosure. In some embodiments, the steps may be performed by an aggregator system, such as aggregator 100 of FIG. 1, aggregator system 202 of FIG. 2, or aggregator system 300 of FIG. 3.

At step 702, authentication information associated with an identified client device may be generated and stored. In some embodiments, authentication information may be generated by processing equipment, for example, authentication circuitry 308 of FIG. 3. In some embodiments, authentication information may be stored in a database, for example, database 304 of FIG. 3. In some embodiments, authentication information may indicate that the client device has been authenticated. In other embodiments, authentication information may indicate that a user in possession of the client device has been authenticated. The authentication information may be associated with a client device that has already been identified, for example, by an aggregator system. In some embodiments, authentication information may include one or more credentials associated with the client device. Credentials may include a digital key which may be used, for example, to enable a purchase transaction on the client device.

At step 704, rules information may be stored. In some embodiments, rules information may be stored in a database, for example, database 304 of FIG. 3. In some embodiments, rules information may be received by another system prior to being stored. In some embodiments, rules information may include rules of different rule types, where rules may be associated with a plurality of interested parties. In some embodiments, rules may be associated with combinations of interested parties. For example, a carrier system and a merchant system may each be associated with a rule of one type, and the combination of the carrier system and the merchant system may be associated with a rule of a different type. Rules may indicate events, conditions, a set of conditions, or a combination thereof that may be identified by an aggregator system and that when identified indicate that authentication for an identified client device should be revoked. Events may be identified, for example, when an event notification is received from an interested party related to a client device. Conditions may be identified, for example, by checking data related to authentication information (e.g., time since authentication granted), or by any other suitable process. For example, an aggregator system may identify events, conditions, or a combination thereof using inputs, outputs, processing equipment, any suitable hardware or software, direct observation, computation, notification, a request for data, or any combination thereof. Different rule types may include, for example, a predetermined time period, a predetermined number of uses, an event identifying the client device as lost, an event identifying the client device as stolen, an event identifying a deactivated mobile number associated with the client device, an event identifying a fraud alert associated with the client device, a detected change between previously stored hashed information associated with a client device and current hashed information associated with a client device, a predetermined change in phone device location, a client device arriving at or leaving a particular location, an unmatched gesture sequence as compared to a previously stored sequence (e.g., stored in aggregator system 300 or any other system), an unmatched fingerprint scan as compared to a previously stored fingerprint scan (e.g., stored in aggregator system 300 or any other system), an unmatched iris scan as compared to a previously stored iris scan (e.g., stored in aggregator system 300 or any other system), a detected blood alcohol level exceeding a predetermined limit, an unmatched DNA profile as compared to a previously stored profile (e.g., stored in aggregator system 300 or any other system), an unmatched vocal recognition pattern as compared to a previously stored pattern (e.g., stored in aggregator system 300 or any other system), an event identifying a change of account ownership associated with the client device, an event identifying that an account holder associated with a client device has deceased, an event identifying that an account associated with the client device has a payment status of past-due, an event identifying activation of a parental control associated with the client device, a predetermined number of transactions made on the client device in a predetermined time period, a predetermined number of transactions made on the client device with a given merchant system in a predetermined time period, a predetermined amount of total refunds granted to the client device in a predetermined time period, a predetermined amount of total refunds granted to the client device from a given merchant in a predetermined time period, a request by an account holder associated with the client device, a request by an interested party associated with the client device, any other suitable rule type, or any combination thereof. For example, a rule associated with a carrier system may be received and stored, and may indicate that authentication for an identified client device should be revoked twenty-four hours after authentication was granted. Additionally, each rule associated with an interested party or a combination of interested parties may be associated with a priority. The priority associated with each rule may, for example, be assigned by processing equipment such as credentials engine 306 of FIG. 3, and may be stored, for example, with the rule. For example, a rule associated with a merchant system and a priority assigned to the rule may be received and stored, and may indicate that authentication for an identified client device should be revoked after the authentication is used to enable twelve purchase transactions.

At step 706, criteria may be defined which indicate when authentication for the identified client device should be revoked. Criteria may be defined, for example, by processing equipment such as credentials engine 306 of FIG. 3. In some embodiments, criteria may include one rule of each rule type. Each rule type defines an event, condition, set of conditions, or combination thereof that may be identified by an aggregator system and that when identified indicate that authentication for an identified client device should be revoked. In some embodiments, defining criteria may include prioritizing one rule associated with an interested party or combination of interested parties over another rule of the same type associated with a different interested party or combination of interested parties based on a hierarchical structure of priority for interested parties. For example, a rule associated with a combination of a carrier system and a merchant system may be prioritized over a rule of the same type associated with only the carrier system. In some embodiments, criteria may include a default rule if no rules were stored which have the default rule type. For example, if no rule that indicates a predetermined time period for revoking authentication is stored, then the criteria may include a default rule that indicates that authentication should be revoked forty-eight hours after it is granted.

At step 708, the aggregator system may determine whether defined criteria have occurred or been met. Defined criteria may have occurred or been met, for example, when at least one event of the criteria has occurred or at least one condition of the criteria is met. For example, if the criteria includes an event criterion that indicates that authentication for a client device should be revoked if it is associated with a fraud alert, and a fraud alert notification is received, then this specific event criterion has been met. If at step 708 the aggregator system determines that criteria defined at step 706 have been met, the system proceeds to step 710.

At step 710, authentication for the identified client device may be revoked. Authentication may be revoked, for example, by processing equipment such as invalidation circuitry 310 of FIG. 3. Revoking authentication of an identified client device may prevent the identified client device from, for example, accessing or using protected information, such as engaging in a purchase transaction and using CRM information to complete the purchase transaction.

Figure 8:
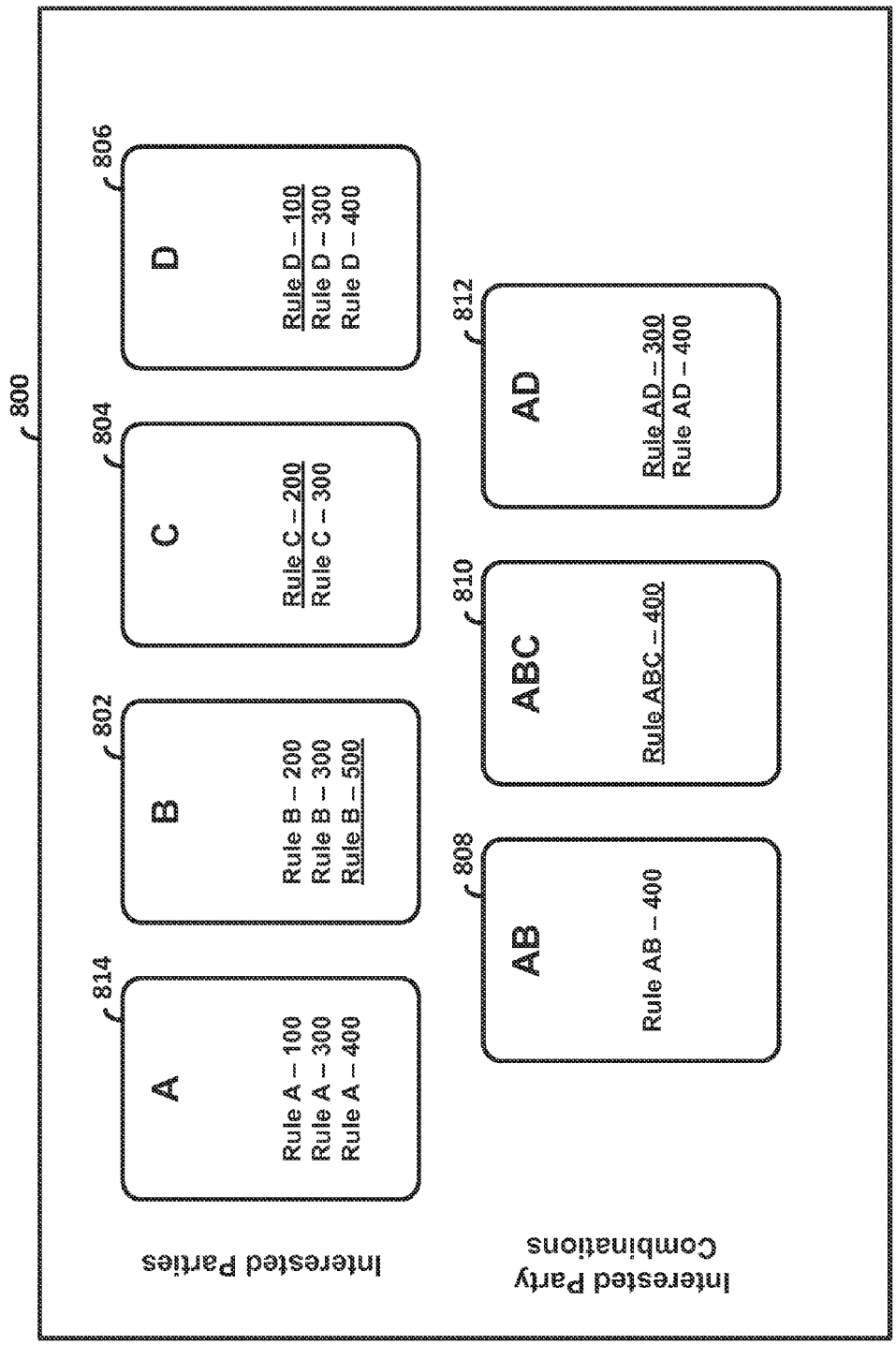
FIG. 8 is a block diagram showing an example of a multi-dimensional framework for defining criteria that indicate when authentication for a client device should be revoked in accordance with some embodiments of the present disclosure.

FIG. 8 is a block diagram showing an illustrative multi-dimensional framework 800 for defining criteria that indicate when authentication for a client device should be revoked in accordance with some embodiments of the present disclosure. In some embodiments, multi-dimensional framework 800 for defining criteria may be included in processing equipment, such as credentials engine 306 of aggregator system 300.

Multi-dimensional framework 800 may define criteria based on interested parties 814, 802, 804, and 806. Each interested party may have one or more rules defined, where each rule has a rule type. For example, interested party 814 has one rule of rule type 100, one rule of rule type 300, and one rule of rule type 400. Rules associated with interested parties may, for example, be rules generated by people associated with an aggregator system that acts as an intermediary between interested parties 814, 802, 804, and 806 and one or more client devices. Multi-dimensional framework 800 may determine rules for combinations of interested parties 808, 810, and 812. Rules for combinations of interested parties may be different than the rules defined for individual interested parties, and may also be rules of different rule types. For example, interested party 814 has one rule of each of rule types 100, 300, and 400, interested party 802 has one rule of each of rule types 200, 300, and 500, and interested party combination 808 has a rule for the combination of interested parties 814 and 802 that is of rule type 400. Multi-dimensional framework 800 may define one rule of each rule type from the rules of the individual interested parties and combinations of interested parties. Defined rules may be enforced by an aggregator system and used to manage authentication for identified client devices. Multi-dimensional framework 800 may select one rule of each rule type from the rules of the individual interested parties and combinations of interested parties based on a priority associated with each rule and based on a hierarchical structure of priority of interested parties and combinations of interested parties. In FIG. 8, the rules defined by multi-dimensional framework 800 are underlined. For example, interested parties 814, 802, 804, and 806 and combination of interested parties 812 may each have a different rule of type 300, and multi-dimensional framework may define a rule of type 300 selected from combination of interested parties 812 because it is the highest priority rule of type 300. A priority may be, for example, a number on a predetermined scale (e.g., 1-100), a verbal rank (e.g., high, medium, low), any other suitable priority, or any combination thereof. Multi-dimensional framework 800 may be configured to assign priority for a rule associated with an interested party with any suitable technique, for example, based on the secrecy of the information provided by the interested party, based on a contract between the interested party and an aggregator system, based on the rule associated with the interested party, based on any other suitable information, or any combination thereof.

Figure 9:
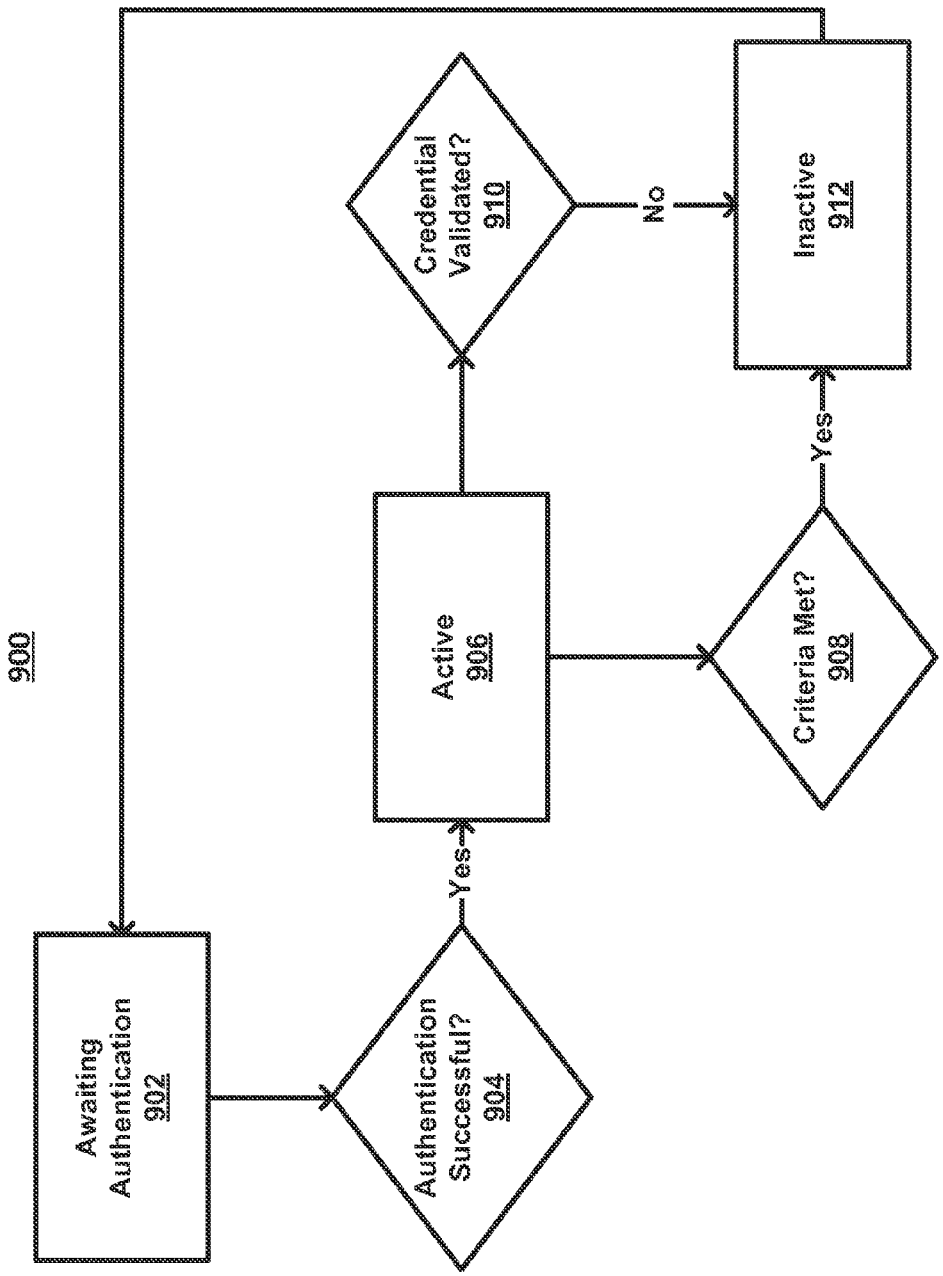
FIG. 9 is a state diagram illustrating the credential lifecycle for client device authentication in accordance with some embodiments of the present disclosure.

FIG. 9 is a state diagram illustrating the credential life-cycle for a client device in accordance with some embodiments of the present disclosure.

At step 902, a client device is awaiting authentication. In some embodiments, a client device awaiting authentication need not yet be authenticated, but may already be engaged in an attempt to be granted authentication. In other embodiments, a client device awaiting authentication need not yet be authenticated, and need not yet be engaged in an attempt to be granted authentication. Authentication may be granted by processing equipment, such as authentication circuitry 308 of aggregator system 300, processing equipment 412 of merchant system 400, authentication circuitry 616 of client device 600, any other suitable processing equipment, or any combination thereof. In some embodiments, an authenticated client device may be allowed to access and/or use protected information, for example, CRM information stored at a carrier system associated with the client device.

At step 904, the authentication status of the client device may be checked. Authentication status may be checked by processing equipment, such as authentication circuitry 308 of aggregator system 300, processing equipment 412 of merchant system 400, authentication circuitry 616 of client device 600, any other suitable processing equipment, or any combination thereof. An authentication status may indicate that the client device is authenticated, or that the client device is not authenticated. If at step 904 it is determined that the client device is authenticated, then the client device authentication becomes active.

At step 906, the client device has been granted authentication, and thus the client device authentication is active. In some embodiments, an authenticated client device may receive a credential, such as a digital key. In some embodiments, an authenticated client device may engage in a purchase transaction or any other suitable transaction requiring authentication, for example, using CRM information stored at a carrier system associated with the client device.

At step 908, criteria indicating when the authentication for the client device should be revoked are checked. The criteria may be defined by processing equipment, such as credentials engine 306 of aggregator system 300. The criteria may include events, conditions, a set of conditions, or a combination thereof that may be identified by an aggregator system and that when identified indicate that authentication for an identified client device should be revoked. For example, criteria may include a condition which specifies that authentication should be revoked 24 hours after authentication is granted to the client device. Criteria may be met, for example, by receiving an event notification which matches an event included in the criteria, by data which matches a condition included in the criteria, by any other suitable method, or any combination thereof. If it is determined that the criteria have been met at step 908, the authentication for the client device is revoked. Otherwise, if the criteria have not been met, the client device may remain authenticated.

At step 910, client device credentials may be checked for validity. In some embodiments, credentials may be received by a client device after authentication is granted. For example, a credential may include an authentication key, such as a digital key, and a valid credential may be one which matches another authentication key possessed by a merchant or aggregator system. In some embodiments, credentials may be checked by processing equipment, such as authentication circuitry 308 of aggregator system 300, processing equipment 412 of merchant system 400, authentication circuitry 616 of client device 600, any other suitable processing equipment, or any combination thereof. In some embodiments, credentials may be checked for validity when the client device attempts to engage in a secure activity, such as a purchase transaction, using the credentials. If the credentials are not indicated to be valid at step 910, the authentication for the client device may be revoked. Otherwise, if the credentials are indicated to be valid, the client device may remain authenticated.

At step 912, the authentications status for the client device is inactive, and the client device is not authenticated. In some embodiments, the client device is not authenticated because authentication has been revoked in response to either of steps 908 or 910. Authentication may be revoked by processing equipment, such as authentication circuitry 308 of aggregator system 300, processing equipment 412 of merchant system 400, authentication circuitry 616 of client device 600, any other suitable processing equipment, or any combination thereof. In some embodiments, a client device that has an inactive authentication status may not be allowed to access and/or use protected information, for example CRM information. In some embodiments, a client device that has an inactive authentication status may transition to step 902 to begin the authentication process again.

Figure 10:
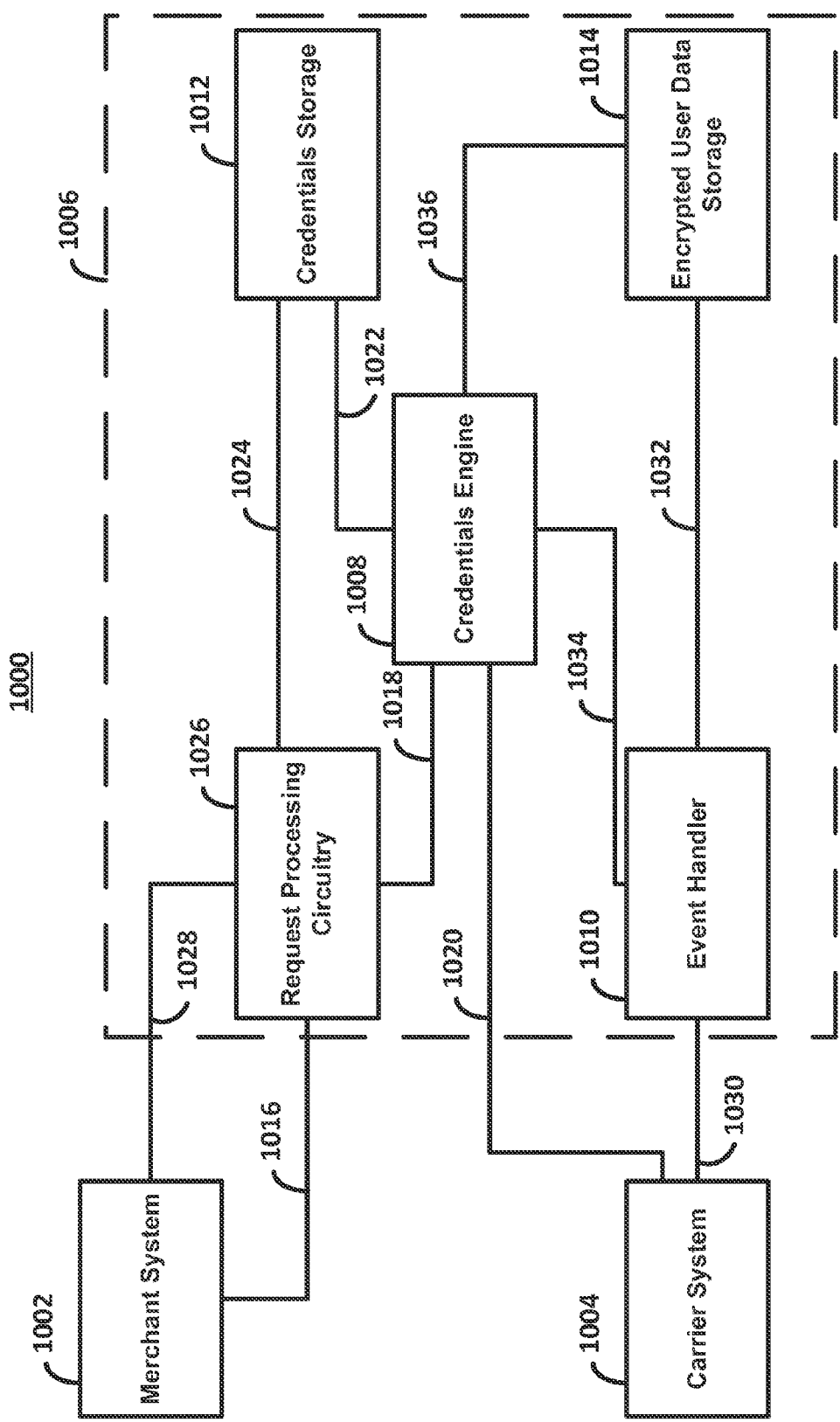
FIG. 10 is a block diagram showing detailed components of an illustrative system including an aggregator system in accordance with some embodiments of the present disclosure.

FIG. 10 is a block diagram showing detailed components of an illustrative aggregator system 1006 in accordance with some embodiments of the present disclosure. Aggregator system 1006 may include request processing circuitry 1006, credentials engine 1008, credentials storage 1012, event handler 1034, and encrypted user data storage 1014, and may communicate with merchant system 1002 and carrier system 1004. Aggregator system 1006 may be any suitable aggregator system, such as aggregator system 300 of FIG. 3, aggregator system 202 of FIG. 2 or aggregator system 100 of FIG. 1. Merchant system 1002 may be any suitable merchant system, such as merchant system 400 of FIG. 4, merchant system 204 of FIG. 2 or merchant system 102 of FIG. 1. Carrier system 1004 may be any suitable carrier system, such as carrier system 500 of FIG. 5, carrier system 208 of FIG. 2 or carrier system 104 of FIG. 1.

Request processing circuitry 1026 may be request processing circuitry 314 of FIG. 3, or may be configured with any suitable software, hardwired instructions, or both to process requests from other systems and devices, such as client device 106 of FIG. 1 or carrier system 104 of FIG. 1. For example request processing circuitry 1026 may be at least a portion of one or more integrated circuit processors. In some embodiments, requests may include a request to validate credentials, a request to authenticate a client device, a request to process a transaction, any other suitable request, or any combination thereof. In some embodiments, request processing circuitry may receive requests from merchant system 1002 via communication path 1016, and may respond to such requests via communication path 1028. For example, merchant system 1002 may request that aggregator system 1006 validate credentials for a client device during a purchase transaction.

Credentials engine 1008 may be credentials engine 306 of FIG. 3, or may be any suitable hardware, software, or both configured to define criteria that indicate when the authentication for an identified client device should be revoked. Criteria may be defined based on rules of different rule types associated with merchant system 1002, carrier system 1004, any other interested parties, or any combination thereof. In some embodiments, criteria may be defined based on rules of different rule types associated with combinations of interested parties. In some embodiments, defining criteria may include defining one rule of each rule type, where the defining is based on a priority associated with each rule. Criteria may include events, conditions, a set of conditions, or a combination thereof that may be identified by an aggregator system and that when identified indicate that authentication for an identified client device should be revoked. Credentials engine 1008 may define criteria based on information, such as rules, received by request processing circuitry via communication path 1018. Credentials engine may additionally communicate with carrier system 1004 via communication path 1020. For example, credentials engine 1008 may define criteria based rules which are received by carrier system 1004 via communication path 1020.

Credentials storage 1012 may be any suitable hardware, software, or both for implementing an organized data storage system capable of storing information related to, for example, criteria defined by credentials engine 1008. Credentials storage 1012 may be included in database 304 of FIG. 3. In some embodiments, credentials storage may send or request criteria to or from credentials engine 1008 via communication path 1022. Credentials storage 1012 may also send or receive information to or from request processing circuitry 1026 via communication path 1024. For example, credentials storage 1012 may store the criteria defined by credentials engine 1008, and may send data corresponding to at least a subset of the criteria to request processing circuitry 1026 upon receiving a request to do so.

Event handler 1010 may be any suitable hardware, software, or both configured to, for example, receive and respond to event notifications. In some embodiments, event handler 1010 may be configured to receive event notifications from carrier system 1004 via communication path 1030, and may be configured to respond to these event notifications by sending information to credentials engine 1008 via communication path 1034, encrypted user data storage 1014 via communication path 1032, or both. An event notification, for example, may be used to check whether criteria defined by credentials engine 1008 have occurred or been met. For example, credentials engine 1008 may define criteria that include an event specifying that authentication for a client device should be revoked when the client device is reported as lost or stolen, and event handler 1010 may receive an event notification form carrier system 1004 indicating that the client device has been lost or stolen.

Encrypted user data storage 1014 may include any suitable hardware, software, or both for implementing an organized data storage system capable of storing information related to, for example, user data, client device data, identification data, authentication data, credential data, CRM data, any other suitable data, and any combination thereof. Encrypted user data storage 1014 may store information in an encrypted form, for example, in a hashed form. In some embodiments, encrypted user data storage 1014 may receive information from event handler 1010 via communication path 1032, and may send information to credentials engine 1008 via communication path 1036. In some embodiments, recent encrypted information may be compared to older encrypted information to determine whether a change in user information has occurred. For example, encrypted user data storage 1014 may encrypt information received from event handler 1010 regarding a particular user, and may send the encrypted information with older encrypted information regarding the same user to credentials engine 1008 to determine whether information associated with the user has changed enough to satisfy criteria for revoking authentication defined by credentials engine 1008.

Figure 11:
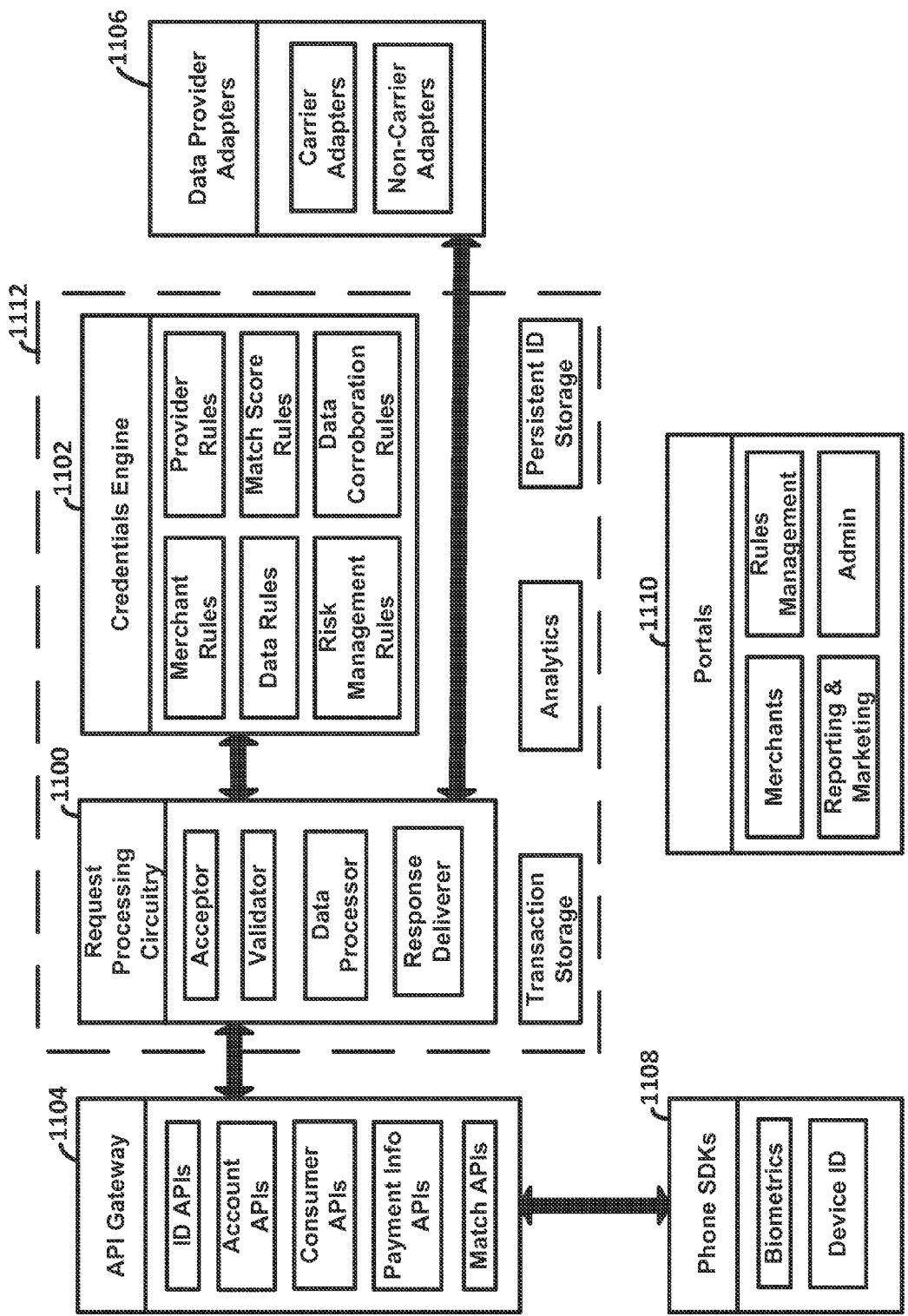
FIG. 11 is another block diagram showing detailed components of an illustrative aggregator system in accordance with some embodiments of the present disclosure.

FIG. 11 is another block diagram showing detailed components of illustrative aggregator system 1112 in accordance with some embodiments of the present disclosure. The aggregator system 1112 may include request processing circuitry 1100, credential engine 1102, transaction storage, analytics, persistent identification storage, any other suitable processing circuitries, storage components, or communication components, or any combination thereof. Aggregator system 1112 may be any suitable aggregator system, such as aggregator system 300 of FIG. 3, aggregator system 202 of FIG. 2 or aggregator system 100 of FIG. 1.

Credential engine 1102 may be credentials engine 306 of FIG. 3, and may be configured to define criteria that indicate when the authentication for an identified client device should be revoked. In some embodiments, an authenticated client device may receive credentials, and when authentication is revoked the credentials may be invalidated. Credential engine 1102 may include merchant rules, provider rules, data rules, match score rules, risk management rules, data corroboration rules, any other suitable rules, or any combination thereof. Rules may define an event or condition, which when matched may cause authentication to be revoked. In some embodiments, credential engine 1102 may determine credentials based at least in part on these rules. Credential engine 1102 may communicate with request processing circuitry 1100. For example, request processing circuitry 1102 may pass rules to credential engine 1102.

Request processing circuitry 1100 may be request processing circuitry 314 of FIG. 3, and may be configured with any suitable software, hardwired instructions, or both to process requests from other systems and devices, such as client device 106 of FIG. 1 or carrier system 104 of FIG. 1. For example, request processing circuitry 1100 may be at least a portion of one or more integrated circuit processors. Request processing circuitry 1100 may include an acceptor, a validator, a data processor, a response deliverer, any other suitable component or processor, or any combination thereof. The acceptor may accept a request, such as a request to consider a rule, and the validator, the data processor, the response deliverer, or any combination thereof, may be used to determine that the rule should be passed to credential engine 1102. Request processing circuitry 1100 may communicate with data provider adapters 1106 and API gateway 1104, for example, to accept or respond to a request.

Data provider adapters 1106 may be configured to enable communication between data providers and aggregator system 1112. Data provider adapters may include carrier adapters configured to enable communication between carrier systems and aggregator system 1112, and non-carrier adapters configured to enable communication between non-carrier systems and aggregator system 1112. Non-carrier systems may include financial institutions, utility companies, government organizations, universities, schools, any other suitable systems, or any combination thereof.

API gateway 1104 may enable interaction and communication between aggregator system 1112 and other systems or devices, such as client device 106 of FIG. 1. For example, a client device may make an API call directly to aggregator system 1112, such as an identification call or request for information call, and API gateway 1104 may enable such an interaction. API gateway 1104 may include identification APIs, account APIs, consumer APIs, payment info APIs, match APIs, any other suitable APIs, or any combination thereof. API gateway 1104 may communicate with client device software development kits (SDKs), such as mobile phone SDKs 1108. Phone SDKs 1108 may allow a client device, such as a mobile phone, to make API calls to aggregator system 1112 via API gateway 1104. Phone SDKs 1108 may include biometrics, device identification information, any other suitable information, or any combination thereof.

Portals 1110 may include systems which are external to aggregator system 1112, such as merchant systems, rules management systems, administrative systems, reporting and marketing systems, any other suitable systems, or any combination thereof. In some embodiments, portals 1110 may communicate with aggregator system 1112, a client device, such as client device 106 of FIG. 1, any other suitable system or device, or any combination thereof.

It will be understood that the steps above are exemplary and that in some implementations, steps may be added, removed, omitted, repeated, reordered, modified in any other suitable way, or any combination thereof.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. An aggregator system comprising:
    a storage system configured to store:
        authentication information associated with an identified client device, wherein the authentication information indicates that the client device has been authenticated; and
        rules information comprising rules of different rule types, wherein the different rule types comprise at least one rule type that is based on time and at least one rule type that is based on something other than time, the rules being associated with a plurality of interested parties, wherein each of the rules has a priority associated therewith;
    circuitry implementing a credentials engine comprising a multi-dimensional framework that defines criteria indicating when authentication of the identified client device should be revoked based on the authentication information, on the rules information, and on the priority associated with each rule, wherein the credentials engine is configured to reconcile the rules associated with the plurality of interested parties, including when a conflict exists; and
    invalidation circuitry configured to revoke authentication for the identified client device based on the criteria.

2. The system of claim 1, wherein the plurality of interested parties comprises at least one of a country, a carrier system, a merchant system, a government organization, and a school organization.

3. The system of claim 1, wherein the authentication information comprises at least one credential.

4. The system of claim 3, wherein the at least one credential comprises a digital key.

5. The system of claim 1, wherein the invalidation circuitry is further configured to revoke authentication for the identified client device based on the criteria being met.

6. The system of claim 5, wherein the criteria are met upon receiving an event notification which matches at least one predetermined event.

7. The system of claim 5, wherein the criteria are met when data associated with the authentication matches at least one condition.

8. The system of claim 1, wherein the rule types comprise at least one of a predetermined time period, a predetermined number of uses, an event identifying the device as lost, an event identifying the device as stolen, an event identifying a deactivated mobile number associated with the client device, an event identifying a fraud alert associated with the client device, a detected change between previously stored hashed information associated with a client device and current hashed information associated with a client device, and any combination thereof.

9. The system of claim 1, wherein the rule types comprise a rule type which specifies detecting a change of information associated with the client device based at least in part on a comparison of previously stored encrypted information associated with the client device to current encrypted information associated with the client device.

10. The system of claim 1, wherein the credentials engine is configured to define criteria which comprise one rule of each of the rule types.

11. The system of claim 1, wherein the criteria comprise a criterion based on a default rule type if the rules do not include a rule of the default rule type.

12. A method comprising:
  storing, on a storage device, authentication information associated with an identified client device, wherein the authentication information indicates that the client device has been authenticated;
    storing, on a storage device, rules information comprising rules of different rule types, wherein the different rule types comprise at least one rule type that is based on time and at least one rule type that is based on something other than time, the rules being associated with a plurality of interested parties, wherein each of the rules has a priority associated therewith;
    defining, using a credentials engine, criteria that indicate when authentication of the identified client device should be revoked based on the authentication information, on the rules information, and on the priority associated with each rule, wherein defining the criteria comprises reconciling the rules associated with the plurality of interested parties when a conflict exists; and
  revoking, using invalidation circuitry, authentication for the identified client device based on the criteria.

13. The method of claim 12, wherein the plurality of interested parties comprises at least one of a country, a carrier system, a merchant system, a government organization, and a school organization.

14. The method of claim 12, wherein the authentication information comprises at least one credential.

15. The method of claim 14, wherein the at least one credential comprises a digital key.

16. The method of claim 12, wherein authentication is revoked for the identified client device based on the criteria being met.

17. The method of claim 16, wherein the criteria are met upon receiving an event notification which matches at least one predetermined event.

18. The method of claim 16, wherein the criteria are met when a particular data point associated with the credential matches at least one condition.

19. The method of claim 12, wherein the rule types comprise at least one of a predetermined time period, a predetermined number of uses, an event identifying the device as lost, an event identifying the device as stolen, an event identifying a deactivated mobile number associated with the client device, an event identifying a fraud alert associated with the client device, a detected change between previously stored hashed information associated with a client device and current hashed information associated with a client device, and any combination thereof.

20. The method of claim 12, wherein the rule types comprise a rule type which specifies detecting a change of information associated with the client device based at least in part on a comparison of previously stored encrypted information associated with the client device to current encrypted information associated with the client device.

21. The method of claim 12, wherein the criteria comprise one rule of each of the rule types.

22. The method of claim 12, wherein the criteria comprise a criterion based on a default rule type if the rules do not include a rule of the default rule type.

* * * * *